(12) United States Patent
Fujita

(10) Patent No.: US 6,526,007 B1
(45) Date of Patent: Feb. 25, 2003

(54) RECORDING MEDIUM DRIVING DEVICE FOR ROTATIONALLY DRIVING A DISK-SHAPED RECORDING MEDIUM HAVING TILT DETECTION MEANS AND TILT DETECTION METHOD

(75) Inventor: Goro Fujita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/762,680

(22) PCT Filed: Jun. 9, 2000

(86) PCT No.: PCT/JP00/03775

§ 371 (c)(1),
(2), (4) Date: Mar. 23, 2001

(87) PCT Pub. No.: WO00/77780

PCT Pub. Date: Dec. 21, 2000

(30) Foreign Application Priority Data

| Jun. 10, 1999 | (JP) | P11-164444 |
| Oct. 18, 1999 | (JP) | P11-295926 |
| Oct. 20, 1999 | (JP) | P11-298304 |

(51) Int. Cl.$^7$ ............................................. G11B 7/00
(52) U.S. Cl. ................................. 369/44.32; 369/53.19
(58) Field of Search ..................... 369/44.13, 44.32, 369/44.33, 47.15, 47.17, 47.19, 53.31, 53.33, 53.12, 53.13, 53.14, 53.19, 53.42, 53.25, 53.29

(56) References Cited

U.S. PATENT DOCUMENTS 5,661,295 A    8/1997  Fukui et al.

FOREIGN PATENT DOCUMENTS

| JP | 7-085487 | 3/1995 |
| JP | 8-017064 | 1/1996 |
| JP | 9-161290 | 6/1997 |
| JP | 9-265649 | 10/1997 |
| JP | 10-302286 | 11/1998 |

*Primary Examiner*—Paul W. Huber
(74) *Attorney, Agent, or Firm*—Oblon, Spivak, McClelland, Maier & Neustadt, P.C.

(57) ABSTRACT

An optical disc reproducing device 10 has an optical pickup 11 for reading out digital data recorded on an optical disc, an amplitude detection circuit 18 for detecting the amplitude of a wobble component signal passed by a band pass filter 14, and a tilt detection, target value setting and drive signal generation circuit 23 for carrying out detection of the tilt quantity. In the optical disc reproducing device 10, a laser beam is cast by the optical pickup 11 onto an optical disc having a recording area with its one sidewall wobbled in a predetermined cycle, then the amplitude of each wobble component signal based on a return light in the case where the laser beam is located on the inner circle side or the outer circle side on the optical disc than the wobbled portion is detected by the amplitude detection circuit 18, and the differential value of the amplitude of the respective wobble component signals is found as a tilt indication value by the tilt detection, target value setting and drive signal generation circuit 23.

48 Claims, 14 Drawing Sheets

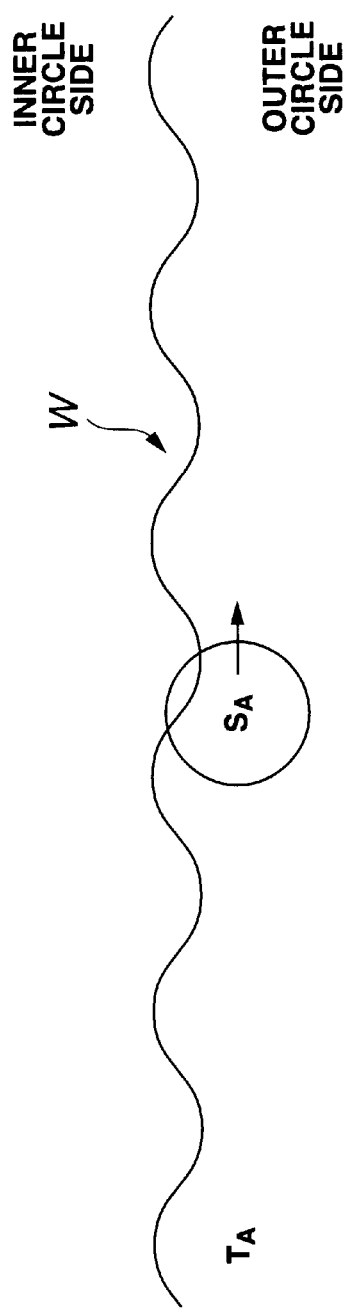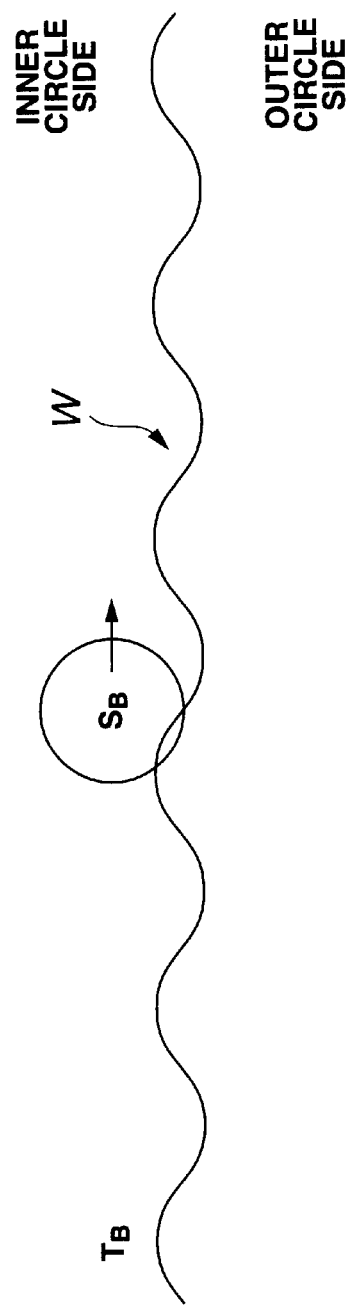
FIG.14A
FIG.14B

RECORDING MEDIUM DRIVING DEVICE FOR ROTATIONALLY DRIVING A DISK-SHAPED RECORDING MEDIUM HAVING TILT DETECTION MEANS AND TILT DETECTION METHOD

TECHNICAL FIELD

This invention relates to a recording medium driving device for rotationally driving a disc-shaped recording medium and thus recording and/or reproducing digital data to and/or from the disc-shaped recording medium, and a tilt detection method for detecting the tilt quantity generated in rotationally driving the disc-shaped recording medium.

BACKGROUND ART

As recording media on which digital data is optically recorded, optical discs such as so-called CDs (compact discs) and DVDs (digital versatile discs or digital video discs) are broadly known.

In an optical disc drive device for recording and/or reproducing digital data to and/or from such optical discs, an optical disc that is rotationally driven is irradiated at a desired position with a minute spot of a condensed laser beam by an optical pickup, thus recording and/or reproducing digital data. In this case, the optical pickup operates with the laser beam tracing a track provided on the optical disc so as to stably record digital data onto the optical disc or reproduce digital data recorded on the optical disc with high fidelity.

Meanwhile, a radial tilt might be generated in the above-described optical disc because of the warp of the optical disc or the inclination of the optical pickup in the optical disc drive device due to the environmental influence such as the temperature and humidity at the time of use and/or storage and the handling state. It is known that such a tilt causes aberration of the regenerative optical spot and therefore brings about distortion of reproduced signals, lowering of the MTF (modulation transfer function), and lowering of the recording power efficiency.

Recently, in optical disc drive devices, the numerical aperture (NA) of the objective lens of the optical pickup tends to be increased for higher density of the optical disc. For example, an objective lens with an NA value of 0.45 is used for CDs and an objective lens with an NA value of 0.60 is used for DVDs. Accordingly, the thickness of the optical disc has been reduced. Thus, the optical disc is likely to warp and has a large NA value, and therefore has increasingly large angular dependency of aberration.

On the other hand, an optical disc drive device which has a dedicated sensor to detect the tilt quantity and incline the objective lens or actuator in its optical pickup on the basis of the detection signal for compensating a tilt has been provided for practical use.

However, if an optical disc of a small diameter is used, the conventional optical disc drive device cannot sufficiently secure the place for installing the sensor for detecting tilt quantity and it is therefore difficult to detect the tilt quantity.

DISCLOSURE OF THE INVENTION

In view of the foregoing status of the art, it is an object of the present invention to provide a recording medium driving device and a tilt detection method which can solve the problem of the tilt detection system of the conventional optical disc drive device and detect the tilt quantity from a signal obtained from the optical pickup quickly and with high accuracy.

A recording medium driving device according to the present invention is adapted for rotationally driving a disc-shaped recording medium in which signal information that can be discriminated from recording data is recorded on one of both sidewalls of a recording area having the recording data recorded thereon, and recording and/or reproducing digital data to and/or from the disc-shaped recording medium. The device comprises: optical pickup means for casting a laser beam onto the disc-shaped recording medium and receiving a return light reflected and diffracted on the surface of the disc-shaped recording medium; amplitude detection means for detecting the amplitude of a signal based on a return light from the signal information recording sidewall, which is the sidewall having the signal information recorded thereon; and tilt detection means for detecting the tilt quantity on the basis of the amplitude of the signal detected by the amplitude detection means.

In the recording medium driving device according to the present invention, the tilt quantity is detected on the basis of the return light from the signal information recording sidewall of the disc-shaped recording medium.

A tilt detection method according to the present invention comprises the steps of: casting a laser beam onto a disc-shaped recording medium in which signal information that can be discriminated from recording data is recorded on one of both sidewalls of a recording area having the recording data recorded thereon, and receiving a return light reflected and diffracted on the surface of the disc-shaped recording medium; detecting the amplitude of a signal based on a return light from the signal information recording sidewall, which is the sidewall having the signal information recorded thereon; and detecting the tilt quantity on the basis of the amplitude of the detected signal detected.

In the tilt detection method according to the present invention, the tilt quantity is detected on the basis of the return light from the signal information recording sidewall of the disc-shaped recording medium.

Moreover, a recording medium driving device according to the present invention is adapted for rotationally driving a disc-shaped recording medium having a signal information recording sidewall on which signal information that can be discriminated from recording data is recorded, and recording and/or reproducing digital data to and/or from the disc-shaped recording medium. The device comprises: optical pickup means for casting a laser beam formed by a main beam spot and two sub-beam spots onto the disc-shaped recording medium and receiving a return light reflected and diffracted on the surface of the disc-shaped recording medium; amplitude detection means for detecting the amplitude of a signal based on a return light of two target beam spots, of the main beam spot and two sub-beam spots, from the signal information recording sidewall; and tilt detection means for detecting the tilt quantity on the basis of the amplitude of the signal detected by the amplitude detection means.

In the recording medium driving device according to the present invention, a laser beam formed by a main beam spot and two sub-beam spots is cast onto the disc-shaped recording medium by the optical pickup means, and the tilt quantity is detected by the tilt detection means on the basis of the amplitude of a signal based on a return light of two target beam spots, of the main beam spot and two sub-beam spots, from the signal information recording sidewall.

Furthermore, a tilt detection method according to the present invention comprises the steps of: casting a laser beam formed by a main beam spot and two sub-beam spots onto a disc-shaped recording medium having a signal information recording sidewall on which signal information that can be discriminated from recording data is recorded, and receiving a return light reflected and diffracted on the surface of the disc-shaped recording medium; detecting the amplitude of a signal based on a return light of two target beam spots, of the main beam spot and two sub-beam spots, from the signal information recording sidewall; and detecting the tilt quantity on the basis of the amplitude of the detected signal.

In the tilt detection method according to the present invention, a laser beam formed by a main beam spot and two sub-beam spots is cast onto the disc-shaped recording medium, and the tilt quantity is detected on the basis of the amplitude of a signal based on a return light of two target beam spots, of the main beam spot and two sub-beam spots, from the signal information recording sidewall.

BRIEF DESCRIPTION OF THE DRAWINGS

FIG. 14A illustrates the arrangement of a beam spot, so as to explain the arrangement of the beam spot in the case where a signal information recording sidewall is located on the inner circle side of the optical disc than a laser beam.

FIG. 14B illustrates the arrangement of a beam spot, so as to explain the arrangement of the beam spot in the case where a signal information recording sidewall is located on the outer circle side of the optical disc than a laser beam.

BEST MODE FOR CARRYING OUT THE INVENTION

Preferred embodiments of the present invention will now be described in detail with reference to the drawings.

In this embodiment, the recording medium driving device according to the present invention is applied to an optical disc reproducing device for reproducing digital data from an optical disc, which is a disc-shaped recording medium having digital data recorded thereon such as a CD (compact disc), DVD (digital versatile disc or digital video disc), or MD (Mini Disc, trade name of Sony Corporation). First, the principle with respect to the tilt detection method using this optical disc reproducing device will be described.

Figure 1:
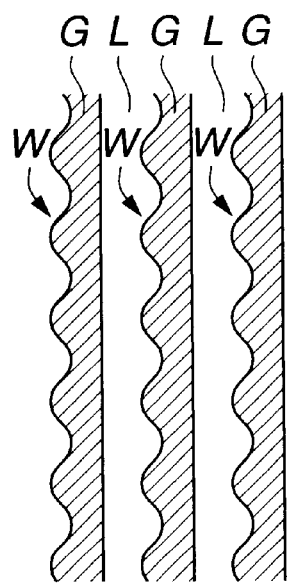
FIG. 1 is an explanatory view showing an optical disc applied to an optical disc reproducing device as an embodiment of the present invention, so as to explain the state of a land/groove substrate on which a groove portion having wobble on its one side and a land part are alternately provided.
Figure 2:
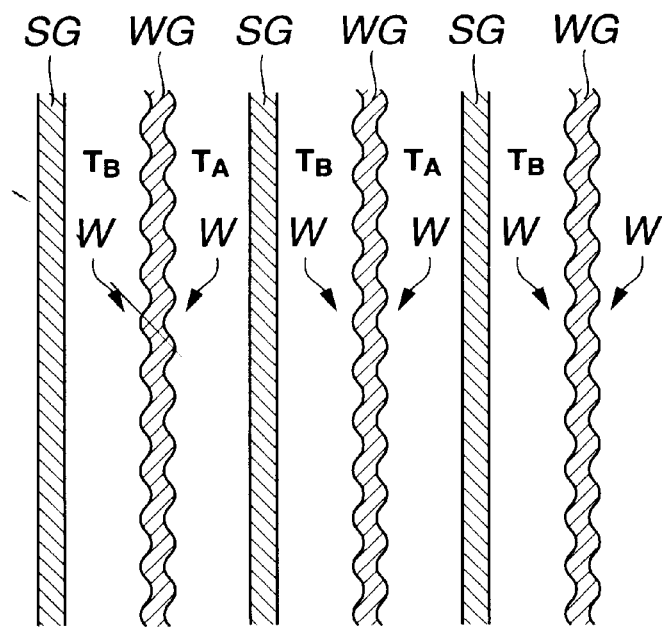
FIG. 2 is an explanatory view showing an optical disc applied to the optical disc reproducing device, so as to explain the state of an intermittent wobble substrate on which a straight groove portion and wobbled groove portion are alternately provided.

Optical discs preferred for the present invention have a recording area in which a groove as a guide groove having wobble on its one side is provided, as shown in FIGS. 1 and 2. Specifically, the optical disc shown in FIG. 1 has a land/groove substrate on which a groove portion G having on its one side a signal information recording sidewall W that is wobbled by providing address information, which is FM-modulated (frequency-modulated) signal information, and a land portion L are alternately provided, and on which these groove portions G and land portions L form tracks $T_{n-1}, T_n, T_{n+1}, T_{n+2}, \ldots$, thus constituting a recording area. The optical disc shown in FIG. 2 is conformable to the so-called MD-data 2 format and has an intermittent wobble substrate on which a straight groove portion SG, which is a non-modulated guide groove having no wobble, and a wobbled groove portion WG, which is a modulated guide groove referred to as double spiral and having on its both sides a signal information recording sidewall W that is wobbled by providing address information FM-modulated at approximately 80 kHz with respect to a standard linear velocity, are alternately provided, and on which the individual address information provided in the wobbled groove portion WG corresponds to two tracks $T_A, T_B$.

Figure 3:
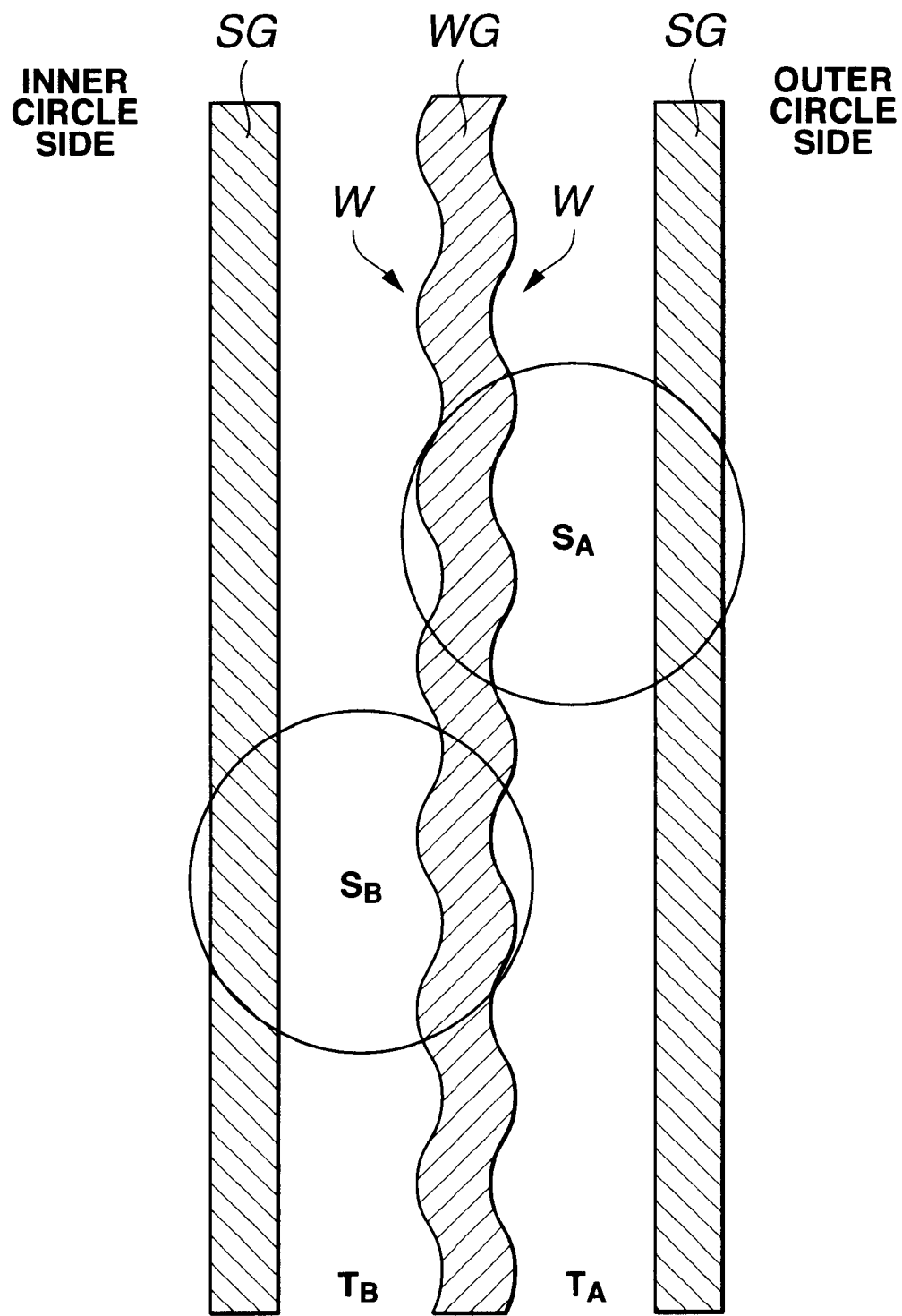
FIG. 3 illustrates the arrangement of beam spots.

In the following description, the intermittent wobble substrate shown in FIG. 2 is used. Also, in the following description, a beam spot in the case where the wobbled groove portion WG is located on the inner circle side of the optical disc than a laser beam from an optical pickup, not shown, is referred to as a spot $S_A$, and a beam spot in the case where the wobbled groove portion WG is located on the outer circle side of the optical disc than a laser beam is referred to as a spot $S_B$, as shown in FIG. 3. Both of these beam spots are Gaussian beams such that their intensity distribution is Gaussian distribution. In the following description, a track irradiated with the spot $S_A$ is referred to as a track $T_A$, and a track irradiated with the spot $S_B$ is referred as a track $T_B$, when necessary.

Figure 4:
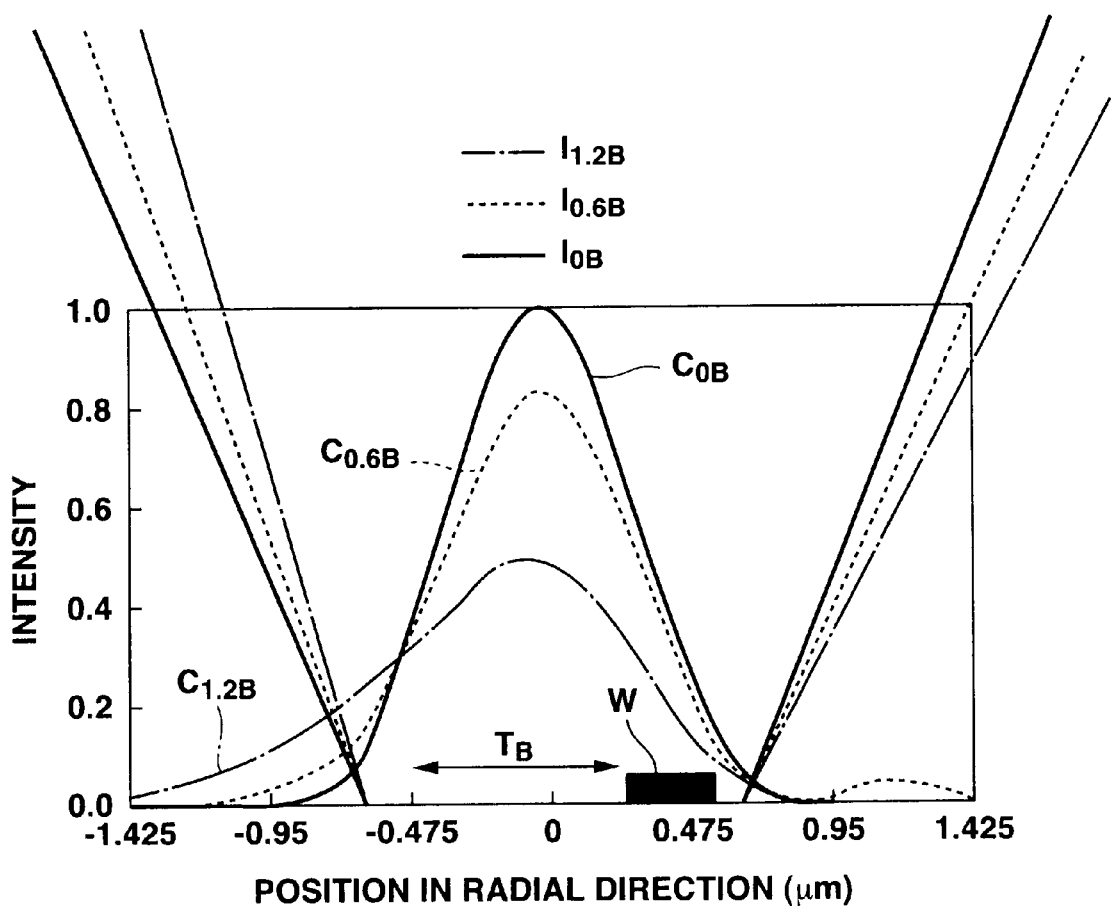
FIG. 4 illustrates the result of numerical computation to find a change in intensity distribution of a laser beam due to a tilt.

FIG. 4 shows the result of numerical computation to find a change in the intensity distribution of the laser beam due to a tilt.

In the case where the spot $S_B$ cast on the optical disc is normally cast without being influenced by a tilt, that is, in the case where the tilt quantity is "0°", the intensity distribution is symmetrical at the center position of the track $T_B$ in the radial direction of the optical disc, as shown by a solid line $C_{0B}$ in FIG. 4. Therefore, the return light reflected and diffracted on the disc surface is symmetrical at the center position of the track $T_B$ in the radial direction of the optical disc.

On the other hand, if the spot $S_B$ cast on the optical disc is inclined toward the signal information recording sidewall W because of the distortion due to the aberration influenced by a tilt, the intensity distribution is as shown by a broken line $C_{0.6B}$ or a chain-dotted line $C_{1.2B}$ in FIG. 4. That is, in the case where the spot $S_B$ cast on the optical disc has a tilt quantity of "0.6°" or "1.2°", the intensity distribution is asymmetrical on the track $T_B$ in the radial direction of the optical disc, as shown by the broken line $C_{0.6B}$ or the chain-dotted line $C_{1.2B}$ in FIG. 4. The intensity of the laser beam cast onto the side of the track $T_B$ where the signal information recording sidewall W is provided is lower than in the case where the laser beam is normally cast, and the intensity of the laser beam cast onto the side of the track $T_B$ where the signal information recording sidewall W is not provided is higher than in the case where the laser beam is normally cast. Such tendency becomes more outstanding as the tilt quantity increases. Therefore, the return light reflected and diffracted on the disc surface is asymmetrical on the track $T_B$, and the intensities $I_{0.6B}$, $I_{1.2B}$ of the return light from the signal information recording sidewall W also differ.

If the spot $S_A$ cast on the optical disc is inclined toward the signal information recording sidewall W as it is influenced by a tilt, the intensity distribution is asymmetrical on the track $T_A$ in the radial direction of the optical disc, though not shown. The intensity of the laser beam cast onto the side of the track $T_A$ where the signal information recording sidewall W is provided is higher than in the case where the laser beam is normally cast, and the intensity of the laser beam cast onto the side of the track $T_A$ where the signal information recording sidewall W is not provided is lower than in the case where the laser beam is normally cast. Therefore, the return light reflected and diffracted on the disc surface is asymmetrical on the track $T_A$, and the intensities of the return light from the signal information recording sidewall W also differ.

Figure 5:
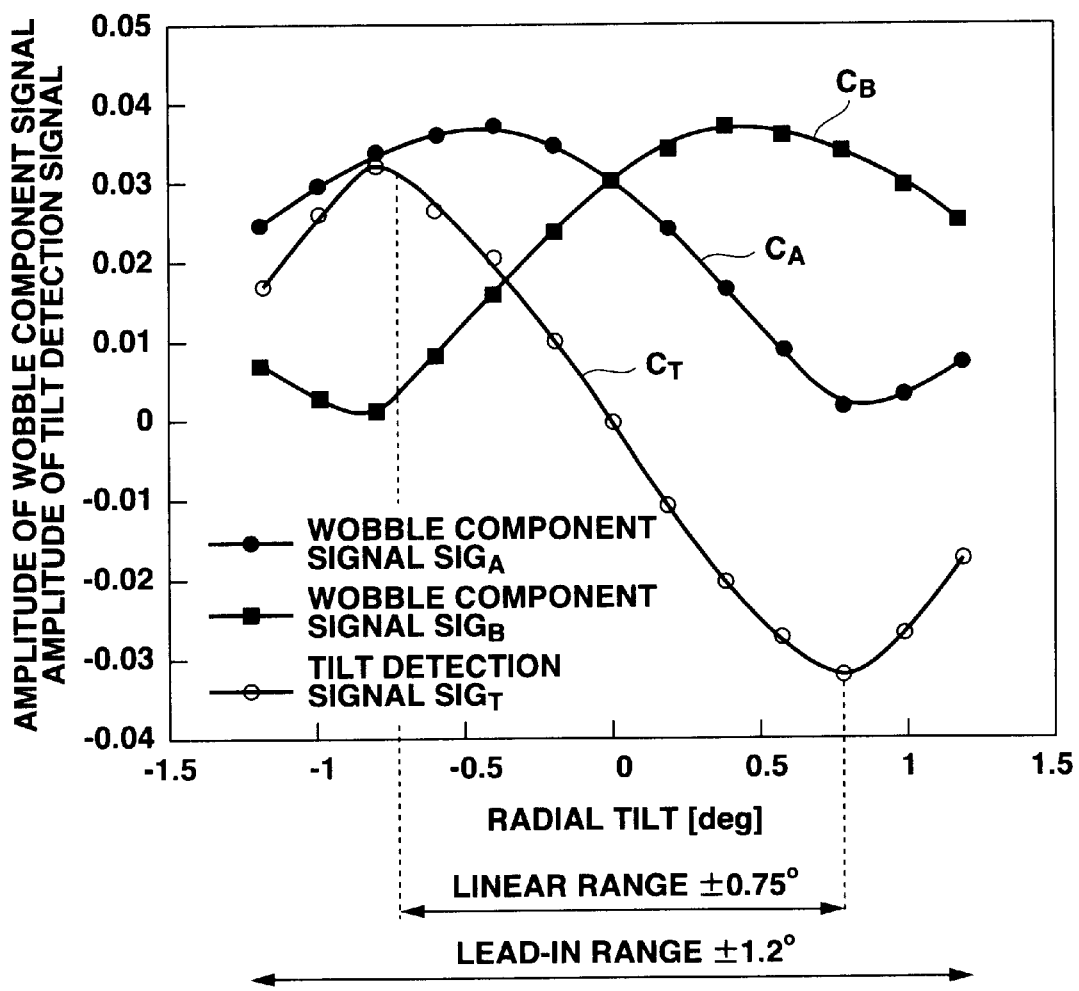
FIG. 5 illustrates the relation between a wobble component signal and the tilt quantity, so as to explain the result of numerical computation to find the characteristic of a wobble component signal in the case where a laser beam is cast onto an optical disc while the tilt quantity is actually changed.

FIG. 5 shows the result of numerical computation to find the characteristic of a signal based on a return light from the signal information recording sidewall W in the case where a laser beam is cast onto the optical disc while the tilt quantity is actually changed. In this case, a wobble component signal, which is the signal based on the return light from the signal information recording sidewall W in accordance with the tilt quantity, is obtained when reproducing ADIP (address in pre-groove) provided in the signal information recording sidewall W.

If a curve plotting changes of the amplitude of the signal based on the return light of the spot $S_A$ from the signal information recording sidewall W in accordance with the tilt quantity (i.e, wobble component signal $SIG_A$) is referred to as a curve $C_A$, and a curve plotting changes of the amplitude of the signal based on the return light of the spot $S_B$ from the signal information recording sidewall W in accordance with the tilt quantity (i.e, wobble component signal $SIG_B$) is referred to as a curve $C_B$, there is presented such tendency that both the amplitude of the wobble component signal $SIG_A$ and the amplitude of the wobble component signal $SIG_B$ are dependent on the tilt quantity and are symmetrical about a tilt quantity of "0°", as shown in FIG. 5. If a signal expressed as the difference between the wobble component signal $SIG_A$ and the wobble component signal $SIG_B$ is referred to as a tilt detection signal $SIG_T$, the linear characteristic within a range of about −0.75° to about +0.75° about a tilt quantity of "0°" can be provided, as indicated by a curve $C_T$. The lead-in range is about −1.2° to about +1.2°.

Figure 6:
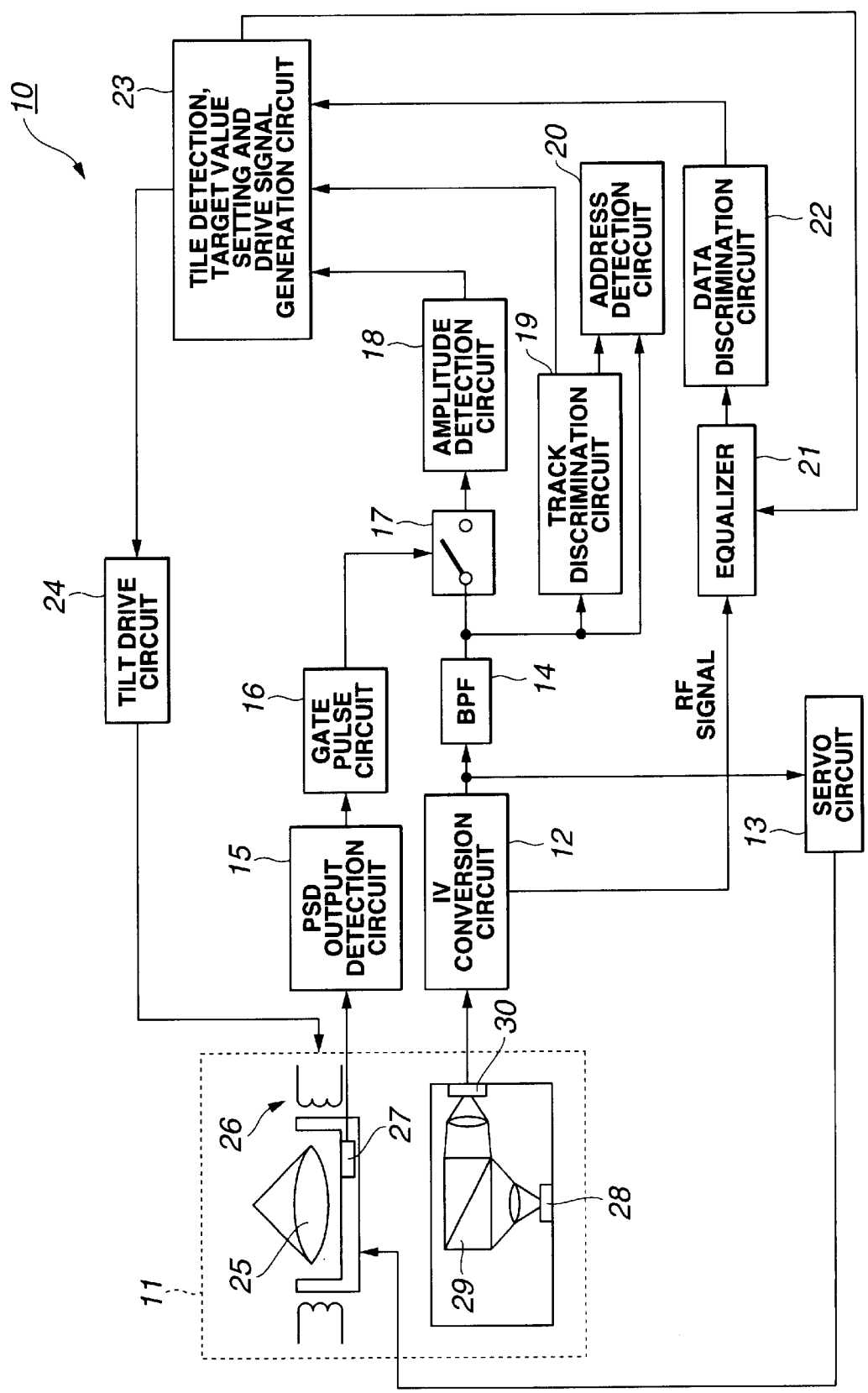
FIG. 6 is a block diagram showing the structure of the optical disc reproducing device.

An optical disc reproducing device 10 shown in FIG. 6 as an embodiment of the present invention is adapted for detecting and compensating the tilt quantity by using such a characteristic.

As shown in FIG. 6, the optical disc reproducing device 10 includes: an optical pickup 11 as optical pickup means for reading out digital data recorded on an optical disc, not shown; an IV conversion circuit 12 for carrying out current-voltage conversion (IV conversion) of the signal outputted from the optical pickup 11; a servo circuit 13 for causing the optical pickup 11 to carry out tracking so as to keep a constant distance from the optical disc and for controlling the rotational driving operation of a spindle motor, not shown; a band pass filter (BPF) 14 for passing a signal of a desired frequency component; a PSD output detection circuit 15 as position detection means for detecting the position of an objective lens 25 with respect to a track on the optical disc on the basis of a detection signal from a position sensing detector (PSD) 27, which is a sensor provided in the optical pickup 11; a gate pulse circuit 16 as gate pulse generation means for generating a gate pulse on the basis of the detection signal from the PSD output detection circuit 15; a switch 17 as switch means for opening and closing on the basis of the gate pulse generated by the gate pulse circuit 16; an amplitude detection circuit 18 as amplitude detection means for detecting the amplitude of the wobble component signal passed by the band pass filter 14; a track discrimination circuit 19 for discriminating whether the wobble component signal passed by the band pass filter 14 is based on the return light from the track $T_A$ or based on the return light from the track $T_B$; an address detection circuit 20 for extracting and detecting the address recorded on the optical disc from the wobble component signal passed by the band pass filter 14; an equalizer 21 as waveform equalization means for performing waveform equalization processing on an RF (radio frequency) signal inputted from the IV conversion circuit 12; a data discrimination circuit 22 as data discrimination means for extracting data from the signal inputted from the equalizer 21 and discriminating the data detection capability; a tilt detection, target value setting and drive signal generation circuit 23 as tilt detection means for carrying out detection of the tilt quantity or the like; and a tilt drive circuit 24 for carrying out control to drive an actuator 26 of the optical pickup 11 for the compensation of the tilt.

The optical pickup 11 has the objective lens 25 for condensing a laser beam from a laser diode 28, the actuator 26 for driving the objective lens 25 by an electromagnetic force, the position sensing detector 27 for sensing the position of the objective lens 25 with respect to a track on the optical disc, the laser diode (LD) 28 for emitting a laser beam, a prism 29 for transmitting the laser beam emitted from the laser diode 28 and for internally reflecting a return light reflected and diffracted on the optical disc surface, and a photodiode (PD) 30 for receiving the return light which is reflected and diffracted on the optical disc surface and made incident thereon by the prism 29.

The objective lens 25 condenses the laser beam from the laser diode 28 and casts it onto the optical disc, not shown.

The actuator 26 has a coil, a magnet and so on, and drives the objective lens 25 by an electromagnetic force so as to cause the objective lens 25 to track at a desired position on the optical disc, not shown.

The position sensing detector 27 is a sensor attached to the actuator 26 for sensing the position of the objective lens 25 with respect to a track on the optical disc. The position sensing detector 27 outputs a detection signal to the PSD output detection circuit 15, which will be described later.

The laser diode 28 has a light emitting section made of, for example, a semiconductor laser, to emit a laser beam. The laser beam emitted from the laser diode 28 becomes incident on the prism 29.

The prism 29 transmits the laser beam which is emitted from the laser diode 28 and made incident thereon, and radiates the laser beam to the objective lens 25. Also, the prism 29 internally reflects the return light which is reflected and diffracted on the optical disc surface and made incident thereon, and radiates the return light to the photodiode 30.

The photodiode 30 has a photodetector and a photoelectric conversion section. The photodiode 30 receives the return light which is reflected and diffracted on the optical disc surface and made incident thereon by the prism 29, then converts the return light into an electric signal, and outputs the electric signal to the IV conversion circuit 12 on the subsequent stage.

Figure 7:
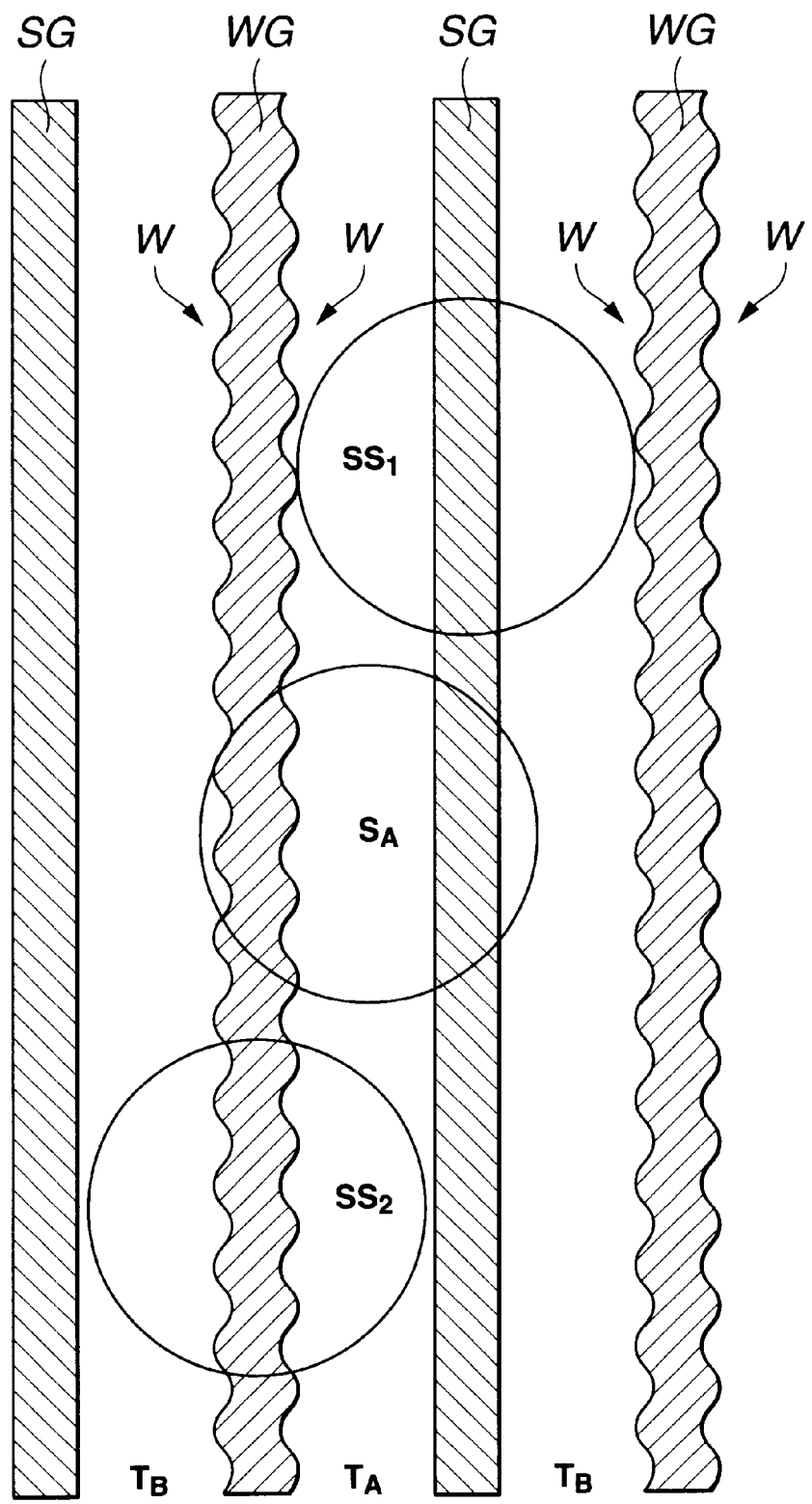
FIG. 7 illustrates the arrangement of a main beam spot and sub-beam spots.

In the optical pickup 11 thus constituted, the laser beam emitted from the laser diode 28 is cast onto the optical disc, not shown, and the return light reflected and diffracted on the optical disc surface is received, thus reading out digital data recorded on the track on the optical disc surface. The optical pickup 11 also has an optical system for, in practice, casting two sub-beam spots $SS_1$, $SS_2$ in addition to the spot $S_A$ (spot $S_B$) as a main beam spot to the optical disc, not shown, and receiving the return lights reflected and diffracted on the optical disc surface, as shown in FIG. 7. The sub-beam spots $SS_1$, $SS_2$ are cast onto the straight groove portion SG or the wobbled groove portion WG in accordance with the position of the main beam spot. The return lights of the sub-beam spots $SS_1$, $SS_2$ reflected and diffracted on the optical disc surface are used for track discrimination of the main beam spot by the track discrimination circuit 19.

The IV conversion circuit 12 carries out current-voltage conversion of the signal outputted from the photodiode 30. The IV conversion circuit 12 outputs the signal as a result of conversion to the servo circuit 13 and the band pass filter 14 on the subsequent stages. The IV conversion circuit 12 also outputs the RF signal as a result of conversion to the equalizer 21 on the subsequent stage.

The servo circuit 13 carries out focusing and driving of the optical pickup 11 so as to keep a constant distance from the optical disc and controls the rotational driving operation of the spindle motor, not shown, on the basis of the signal supplied from the IV conversion circuit 12.

The band pass filter 14 cuts off the RF signal component and other noise components and passes a signal of a desired frequency component so as to take out the wobble component signal from the wobbled groove portion WG, of the signal supplied from the IV conversion circuit 12. The wobble component signal passed by the band pass filter 14 is supplied to the switch 17, the track discrimination circuit 19 and the address detection circuit 20 on the subsequent stages.

The PSD output detection circuit 15 detects the position of the objective lens 25 with respect to the track on the optical disc on the basis of the detection signal supplied from the position sensing detector 27. The PSD output detection circuit 15 outputs the detection signal indicating the result of detection of the position of the objective lens 25 to the gate pulse circuit 16 on the subsequent stage.

The gate pulse circuit 16 generates a gate pulse on the basis of the detection signal from the PSD output detection circuit 15. Specifically, the gate pulse circuit 16 generates a gate pulse to close the switch 17 on the subsequent stage when it is discriminated that the objective lens 25 is located near the center (zero point) of the track on the optical disc, on the basis of the detection signal from the PSD output detection circuit 15. When it is discriminated that the objective lens 25 is located outside of the vicinity of the center of the track on the optical disc, the gate pulse circuit 16 causes the switch 17 to open.

The switch 17 opens and closes in accordance with the gate pulse generated by the gate pulse circuit 16, thus connecting and cutting off the band pass filter 14 and the subsequent amplitude detection circuit 18, as described above.

The amplitude detection circuit 18 detects the amplitude of the wobble component signal passed by the band pass filter 14. The amplitude detection circuit 18 supplies an amplitude detection signal indicating the detected amplitude to the tilt detection, target value setting and drive signal generation circuit 23 on the subsequent stage.

The track discrimination circuit 19 discriminates whether the wobble component signal passed by the band pass filter 14 is based on the return light from the track $T_A$ like the above-described spot $S_A$ or based on the return light from the track $T_B$ like the spot $S_B$.

Specifically, the track discrimination circuit 19 carries out track discrimination of the main beam spot in the following manner. For example, if the spot $S_A$ as the main beam spot is cast as shown in FIG. 7, the signal based on the return light of the sub-beam spot $SS_2$ has a predetermined frequency because of the influence of the signal information recording sidewall W which is wobbled by providing the FM-modulated address information. Therefore, a signal obtained by filtering this signal through the band pass filter 14 has a predetermined amplitude value. On the other hand, the signal based on the return light of the sub-beam spot $SS_1$ includes only a DC component, and therefore a signal obtained by filtering this signal through the band pass filter 14 has an amplitude value of approximately "0". Thus, the track discrimination circuit 19 can discriminate whether the main beam spot is the spot $S_A$ or the spot $S_B$, by comparing the signals obtained by filtering the signals based on the return lights of the sub-beam spots $SS_1$, $SS_2$ through the band pass filter 14.

The track discrimination circuit 19 supplies a track discrimination signal indicating the result of track discrimination to the tilt detection, target value setting and drive signal generation circuit 23 on the subsequent stage.

The address detection circuit 20 extracts and detects the address recorded on the optical disc from the wobble component signal passed by the band pass filter 14.

The equalizer 21 is supplied with the RF signal from the IV conversion circuit 12 and performs waveform equalization processing for the correction of a jitter error of the RF signal or the like. The equalizer 21 adjusts the gain on the basis of a tilt error signal supplied from the tilt detection, target value setting and drive signal generation circuit 23, which will be described later, and thus compensates the lowering of the MTF (modulation transfer function). The equalizer 21 outputs the signal on which waveform equalization processing has been performed, to the data discrimination circuit 22 on the subsequent stage.

The data discrimination circuit 22 extracts data from the signal inputted from the equalizer 21 and discriminates the data detection capability such as the jitter error. The data discrimination circuit 22 supplies a data discrimination signal indicating the result of discrimination of the data detection capability to the tilt detection, target value setting and drive signal generation circuit 23 on the subsequent stage.

The tilt detection, target value setting and drive signal generation circuit 23 detects the tilt quantity on the basis of the amplitude detection signal of the wobble component signal supplied from the amplitude detection circuit 18, the track discrimination signal supplied from the track discrimination circuit 19, and the data discrimination signal supplied from the data discrimination circuit 22. The tilt detection, target value setting and drive signal generation circuit 23 also sets a target value for compensation with respect to a tilt indication value indicating the detected tilt quantity. Moreover, the tilt detection, target value setting and drive signal generation circuit 23 generates a drive signal for driving the tilt drive circuit 24, which will be described later, for compensating the tilt on the basis of a tilt error signal expressed as the differential value between the tilt indication value and the target value. The tilt detection, target value setting and drive signal generation circuit 23 supplies the detected tilt error signal to the equalizer 21 and supplies the generated drive signal to the tilt drive circuit 24 on the subsequent stage.

The tilt drive circuit 24 generates a control signal on the basis of the drive signal supplied from the tilt detection, target value setting and drive signal generation circuit 23, and drives the actuator 26 of the optical pickup 11 into the direction of compensating the tilt.

In the optical disc reproducing device 10 thus constituted, the wobble component signal $SIG_A$ in the case where the laser beam is cast onto the track $T_A$ like the above-described spot $S_A$ and the wobble component signal $SIG_B$ in the case where the laser beam is cast onto the track $T_B$ like the spot $S_B$ are sampled, and the tilt indication value expressed as the differential value between the wobble component signal $SIG_A$ in the case where the laser beam is cast onto the track $T_A$ and the wobble component signal $SIG_B$ in the case where the laser beam is cast onto the track $T_B$ is found by the tilt detection, target value setting and drive signal generation circuit 23. Then, the optical pickup 11 is controlled and driven so as to make the tilt indication value closer to the preset target value.

In the optical disc reproducing device 10, though a preset arbitrary value or a value recorded on a control track as a control information recording area of the optical disc may be used as the target value, the target value can also be set by the following method as the initial operation in loading the optical disc.

In the optical disc reproducing device 10, at the time of loading the optical disc, the drive signal generated by the tilt detection, target value setting and drive signal generation circuit 23 is supplied to the tilt drive circuit 24, and the actuator 26 of the optical pickup 11 is driven under the control of the tilt drive circuit 24 while the tilt quantity is changed. Then, in the optical disc reproducing device 10, the tilt indication value corresponding to the change in the tilt quantity is found by the tilt detection, target value setting and drive signal generation circuit 23, and the correlation between the tilt indication value thus found and the data detection error based on the data discrimination signal supplied from the data discrimination circuit 22 is measured. The tilt indication value that minimizes the data detection error is set as the target value.

In this manner, in the optical disc reproducing device 10, an optimum target value can be set on the basis of the correlation between the tilt indication value and the data detection error.

Figure 8:
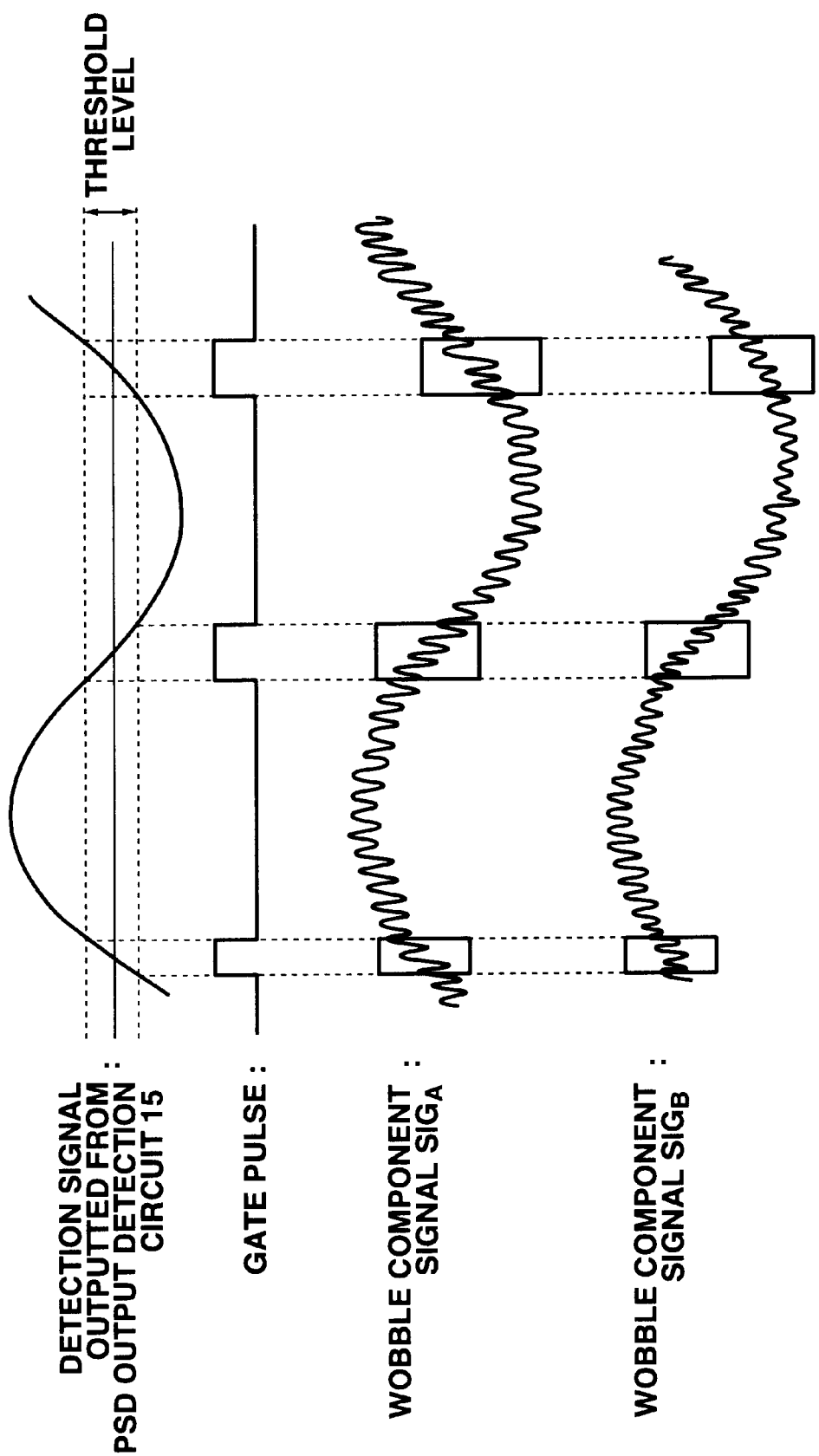
FIG. 8 illustrates a sampling method for a wobble component signal.

Also, in the optical disc reproducing device 10, the accuracy of the tilt indication value can be improved by using the following method in sampling the wobble component signal $SIG_A$ in the case where the laser beam is cast onto the track $T_A$ and the wobble component signal $SIG_B$ in the case where the laser beam is cast onto the track $T_B$. The sampling method will now be described with reference to FIG. 8.

In general, the return light reflected and diffracted on the optical disc surface shifts on the photodiode 30 as the optical pickup 11 is driven. Therefore, the wobble component signal changes, too, as the optical pickup 11 is driven. The tilt indication value found by the tilt detection, target value setting and drive signal generation circuit 23 changes not only due to the influence of the tilt itself but also due to the driving of the optical pickup 11. Thus, in the optical disc reproducing device 10, a wobble component signal near the center (zero point) of the track on the optical disc is sampled, where the wobble component signal has a large amplitude and is sharp because of little influence of noise or the like and where little shaking of the objective lens 25 occurs due to the driving, within the range of driving of the optical pickup 11 on the optical disc.

First, in the optical disc reproducing device 10, when driving the optical pickup 11 on the optical disc, the position of the objective lens 25 with respect to the track on the optical disc is detected by the PSD output detection circuit 15.

Then, in the optical disc reproducing device 10, the range for the objective lens 25 to be located near the center (zero point) of the track on the optical disc is preset as a threshold level, and when the objective lens 25 is located within the range of this threshold level, a gate pulse for closing the switch 17 is generated by the gate pulse generation circuit 16.

Then, in the optical disc reproducing device 10, the amplitude of the wobble component signal inputted by thus controlling and closing the switch 17 is detected by the amplitude detection circuit 18, and various types of information are supplied to the tilt detection, target value setting and drive signal generation circuit 23 via the track discrimination circuit 19.

In the optical disc reproducing device 10, such processing is carried out for the wobble component signal $SIG_A$ in the case where the laser beam is cast onto the track $T_A$ and for the wobble component signal $SIG_B$ in the case where the laser beam is cast onto the track $T_B$, and information related to the wobble component signal $SIG_A$ and the wobble component signal $SIG_B$ is supplied to the tilt detection, target value setting and drive signal generation circuit 23. As described above, the discrimination between the wobble component signal $SIG_A$ in the case where the laser beam is cast onto the track $T_A$ and the wobble component signal $SIG_B$ in the case where the laser beam is cast onto the track $T_B$ is carried out by the track discrimination circuit 19.

In this manner, the optical disc reproducing device 10 can carry out tilt detection and compensation with high accuracy.

The characteristic of the signal based on the return light from the wobbled groove portion WG in the case where the laser beam is cast onto the optical disc while the tilt quantity is changed is as shown in FIG. 5. In practice, however, an offset is generated at the point of intersection between the curve $C_A$ and the curve $C_B$, resulting in a different point from the point where the tilt quantity is "0°". That is, neither the amplitude of the wobble component signal $SIG_A$ nor the amplitude of the wobble component signal $SIG_B$ is symmetrical about the point where the tilt quantity is "0°" and therefore the tilt detection signal $SIG_T$ is not symmetrical about the point where the tilt quantity is "0°".

The main causes of such an imbalance phenomenon reside in a cutting process in manufacturing the master of the optical disc.

Figure 9:
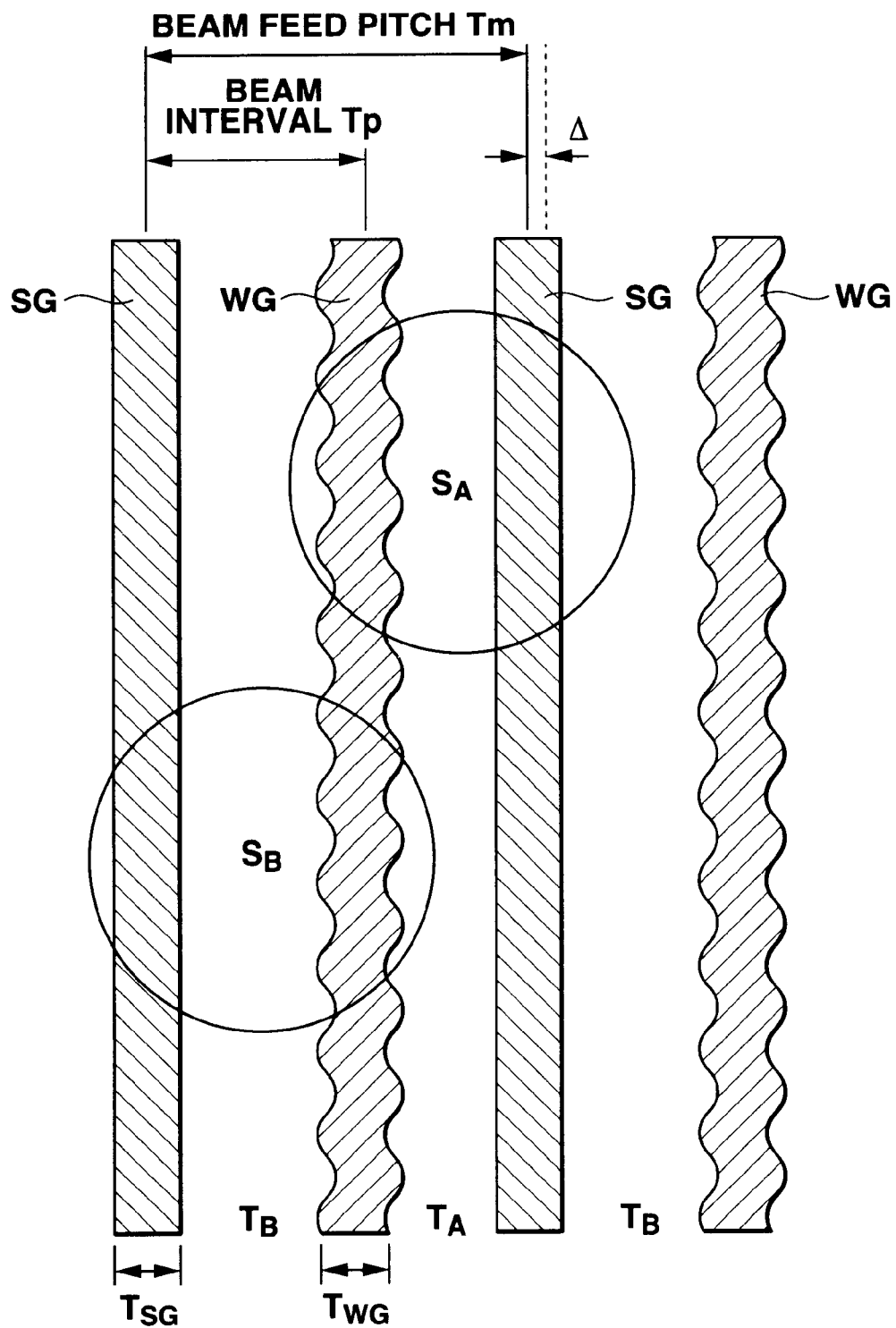
FIG. 9 illustrates a cause of an imbalance phenomenon.

As the first cause, a feed error of a laser beam for cutting may be considered. In the cutting process, in general, a laser beam for forming the straight groove portion SG and a laser beam for forming the wobbled groove portion WG are operated in parallel on the master of the optical disc so as to carry out cutting. The first cause resides in such an operation. As shown in FIG. 9, when the laser beam for forming the straight groove portion SG is shifted to the position to form the next straight groove portion SG, or when the laser beam for forming the wobbled groove portion WG is shifted to the position to form the next wobbled groove portion WG, the beam feed pitch $T_m$ should be expressed by $$T_m = T_p \times 2$$

using the beam interval $T_p$ indicating the interval between the laser beam for forming the straight groove portion SG and the laser beam for forming the wobbled groove portion WG. However, the beam feed pitch $T_m$ influenced by a beam feed error is expressed by $$T_m \neq T_p \times 2 = T_p \times 2 \pm \text{Å}$$

and this leads to the first cause. In this case, when the laser beam for reproduction is shifted from the track $T_A$ to the next $T_A$, or when the laser beam for reproduction is shifted from the track $T_B$ to the next track $T_B$, the laser beam is shifted to a position deviated from the center position of the track.

The second cause of the imbalance phenomenon resides in an error in the degree of modulation of the laser beam for forming the wobbled groove portion WG in the cutting process. In the cutting process, in general, the laser beam for forming the wobbled groove portion WG is minutely moved in the radial direction on the master of the optical disc, thus forming the wobbled groove portion WG. The second cause resides in such an operation. As shown in FIG. 9, the groove width $T_{SG}$ of the straight groove portion SG and the groove width $T_{WG}$ of the wobbled groove portion WG should be in the relation of $$T_{SG} = T_{WG}$$

but this relation influenced by an error in the degree of modulation of the wobbled groove portion WG is expressed by $$T_{SG} \neq T_{WG}$$

which leads to the second cause. In this case, too, when the laser beam for reproduction is shifted from the track $T_A$ to the next $T_A$, or when the laser beam for reproduction is shifted from the track $T_B$ to the next track $T_B$, the laser beam is shifted to a position deviated from the center position of the track.

Figure 10:
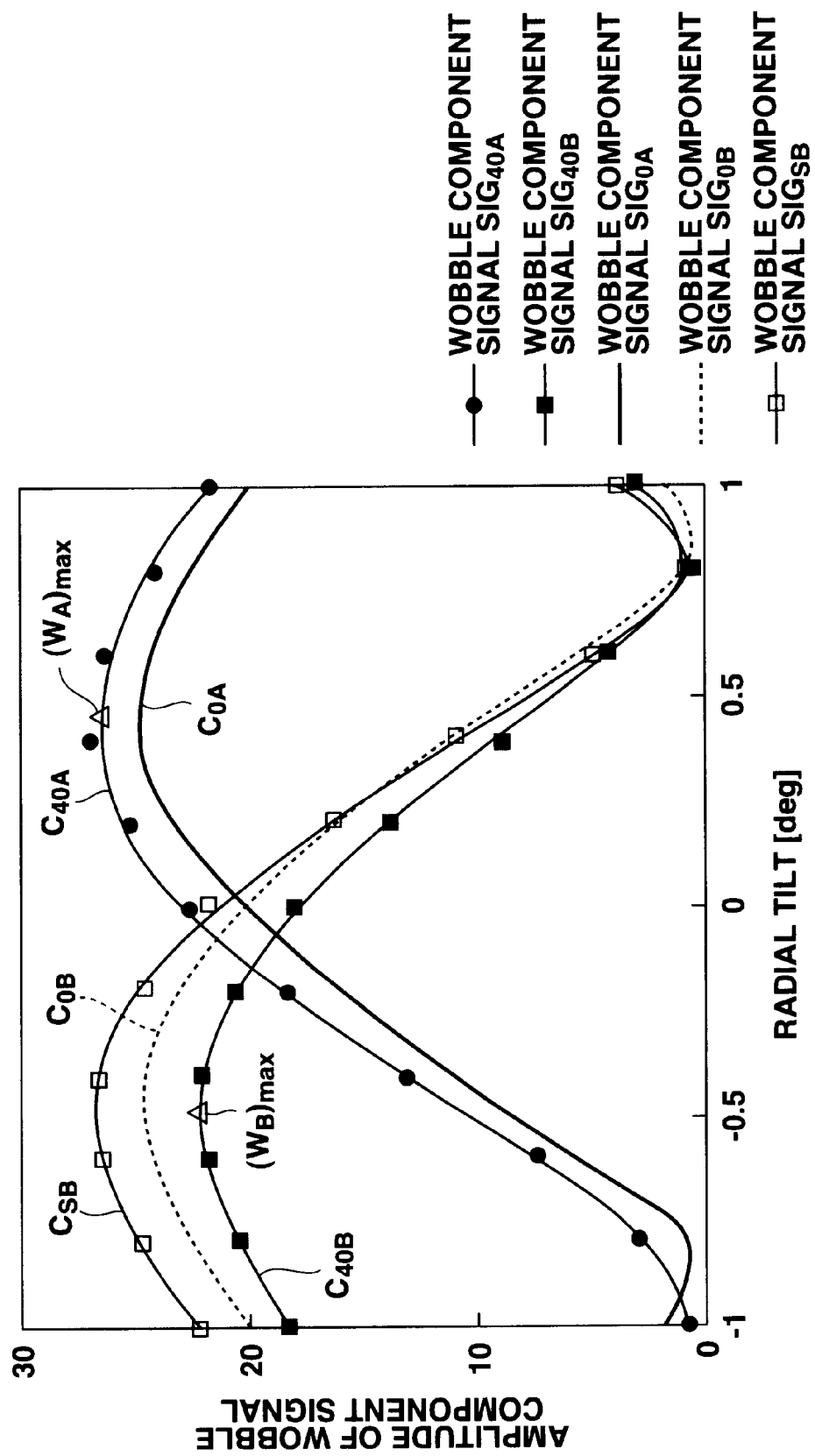
FIG. 10 illustrates the relation between a wobble component signal and the tilt quantity, so as to explain the result of computation to find the characteristic of the wobble component signal in the case where a laser beam is cast onto an optical disc while the tilt quantity is changed, and the characteristic of a standardized wobble component signal.

Actually, the results of calculating the changes in the amplitude of the wobble component signals $SIG_{40A}$, $SIG_{40B}$ with respect to the tilt quantity in the case where a laser beam is cast onto an optical disc with a track pitch of 0.95 µm and where a feed error of Å=40 nm is given are expressed by the curves $C_{40A}$, $C_{40B}$ in FIG. 10. For comparison, FIG. 10 also shows the curves $C_{0A}$, $C_{0B}$, which are the results of calculating the changes in the amplitude of the wobble component signals $SIG_{0A}$, $SIG_{0B}$ with respect to the tilt quantity in the case where a laser beam is cast onto an optical disc with a track pitch of 0.95 µm and where Å=0 is given.

It can be understood from FIG. 10 that the point of intersection between the curve $C_{0A}$ and the curve $C_{0B}$ is a point where the tilt quantity is "0°" but that the point of intersection between the curve $C_{40A}$ and the curve $C_{40B}$ is a point where the tilt quantity is not "0°" and an offset of approximately 0.2° is generated.

Thus, in the optical disc reproducing device 10, standardization is carried out by the tilt detection, target value setting and drive signal generation circuit 23 so that the peak value of one of the wobble component signals with respect to the tilt quantity coincides with the peak value of the other wobble component signal, thus eliminating the offset.

Specifically, if the values of the wobble component signals $SIG_A$, $SIG_B$ with respect to the tilt quantity are expressed as $W_A$, $W_B$, respectively, the optical disc reproducing device 10 causes the tilt detection, target value setting and drive signal generation circuit 23 to find the peak values $(W_A)_{max}$, $(W_B)_{max}$ of the wobble component signals $SIG_A$, $SIG_B$ with respect to the tilt quantity, and to calculate $$W_A \times (W_B)_{max} / (W_A)_{max}$$

or $$W_B \times (W_A)_{max} / (W_B)_{max}$$

so as to find the standardized wobble component signal.

The result of calculating the changes in the amplitude of the wobble component signal $SIG_{SB}$ obtained by calculating $$W_B \times (W_A)_{ma} / (W_B)_{max}$$

for standardizing the wobble component signal $SIG_{40B}$ is expressed by the curve $C_{SB}$ in FIG. 10. As understood from FIG. 10, by standardizing the wobble component signal $SIG_{40B}$, the amplitude of the wobble component signal $SIG_{40A}$ and the amplitude of the wobble component signal $SIG_{SB}$ are made symmetrical about the point where the tilt quantity is "0°".

In this manner, the optical disc reproducing device 10 can correct the imbalance phenomenon. In the optical disc reproducing device 10, this imbalance phenomenon correction processing is carried out in measuring the correlation between the tilt indication value and the data detection error at the time of loading the above-described optical disc, for example, in order to set a target value for the compensation with respect to the tilt indication value, thus enabling tilt detection and compensation with high accuracy.

Meanwhile, for example, in the case of storing the amplitude value of the wobble component signal on the track $T_A$ and the track $T_B$ and later carrying out computation, additional tilt quantity detection time and computation time are required for at least two rotations other than the normal operation. Therefore, when seek is performed from the inner circle having a small tilt quantity to the outer circle having a large tilt quantity on the optical disc, a latency time of two rotations +åis required, causing such a problem that the effective access speed is lowered.

In the case of detecting the tilt quantity on the basis of sample information for one turn within one rotation of the optical disc, there arises a problem that contour fluctuations cannot be followed. For example, if the optical disc is rotating at 600 rpm, the time constant is as large as approximately 2 seconds. Morever, in the case of continuously reproducing only one of the track $T_A$ and the track $T_B$, there arises a problem that the tilt quantity cannot be detected.

In order to solve these problems, an improvement of the optical disc reproducing device 10 is proposed. Specifically, it is considered to improve the optical disc reproducing device 10, and detect the tilt quantity by utilizing the sub-beam spots $SS_1$, $SS_2$ used for the above-described track discrimination of the main beam spot. In this case, optical discs preferred for the application of the present invention are as shown in FIGS. 11 to 13, depending on the recording area.

Figure 11:
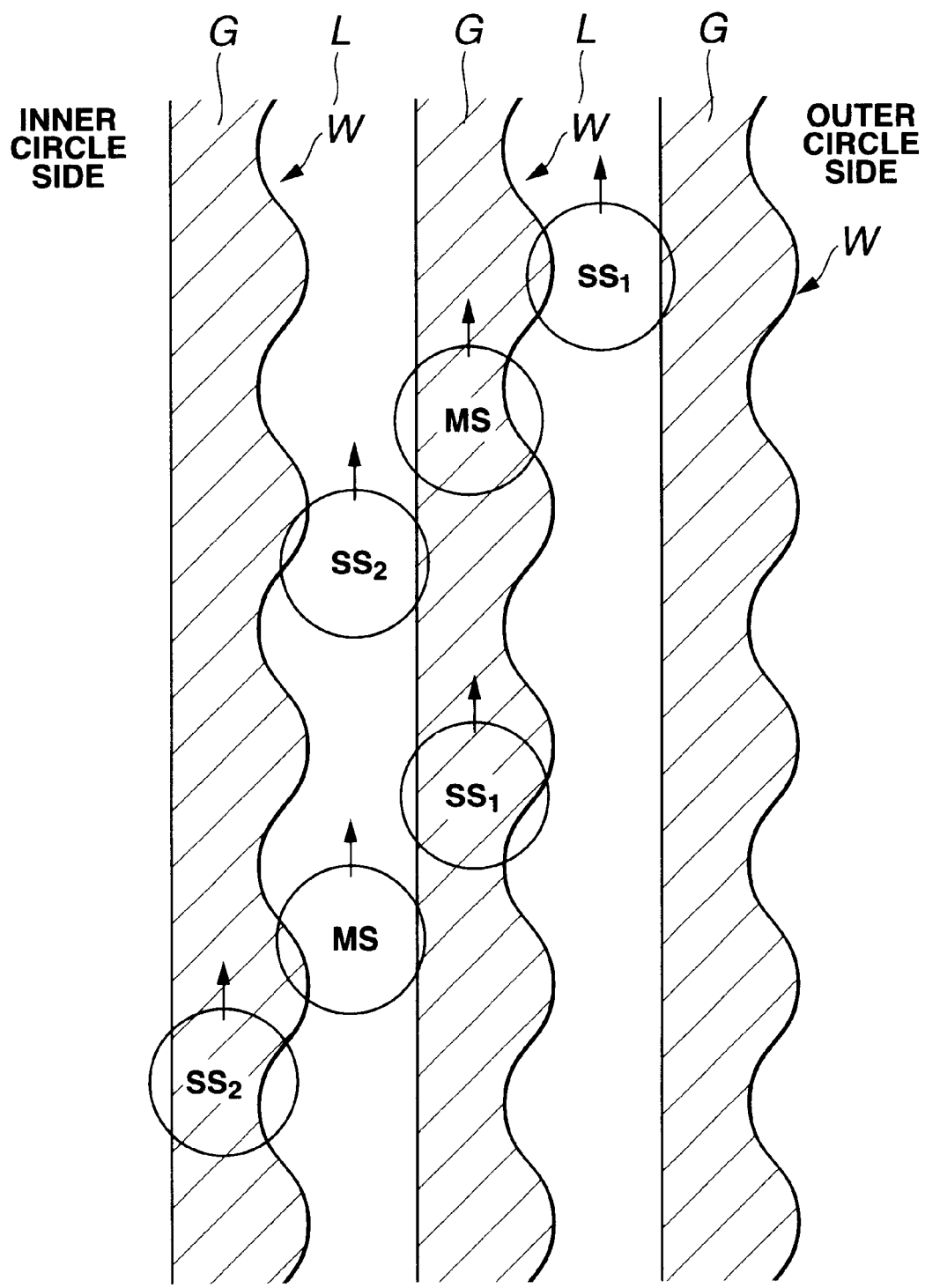
FIG. 11 is an explanatory view showing an optical disc applied to an optical disc reproducing device as an improvement of the foregoing optical disc reproducing device, so as to explain the state of a land/groove substrate on which a groove portion and a land portion are alternately provided.

Specifically, the optical disc shown in FIG. 11 is similar to the optical disc shown in FIG. 1 and has a land/groove substrate on which a groove portion G having on either its inner circle side or outer circle side a signal information recording sidewall W that is wobbled by providing FM-modulated address information and a land portion L are alternately provided, and on which these groove portions G and land portions L form recording areas, respectively. In the optical disc shown in FIG. 11, the groove portion G having the signal information recording sidewall W on its outer circle side on the optical disc is provided.

Figure 12:
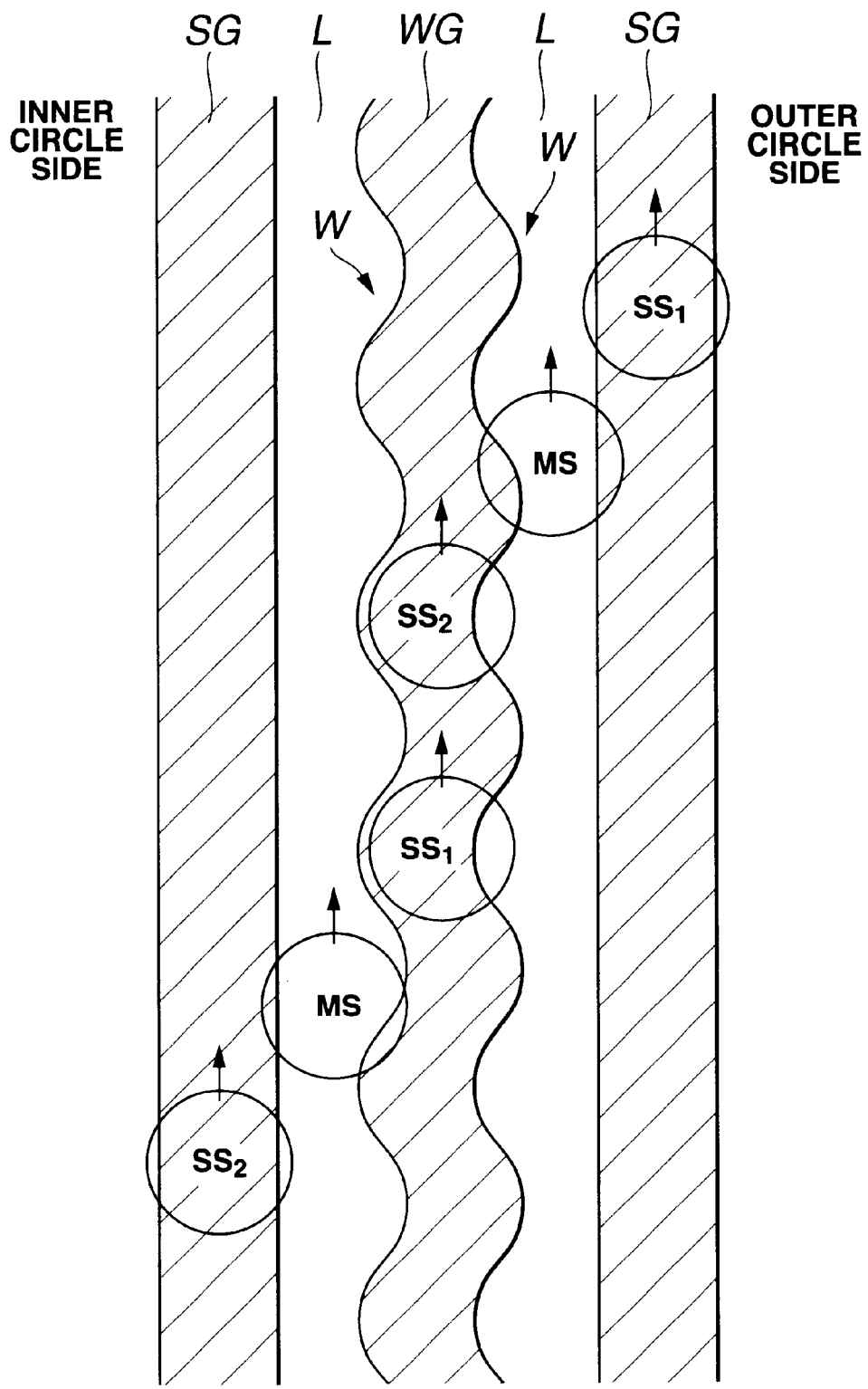
FIG. 12 is an explanatory view showing an optical disc applied to the optical disc reproducing device, so as to explain the state of a groove substrate on which a straight groove portion and a wobbled groove portion are alternately provided.

The optical disc shown in FIG. 12 is similar to the optical disc shown in FIG. 2 and has a groove substrate on which a straight groove portion SG, which is a non-modulated guide groove having no wobble, and a wobbled groove portion WG, which is a modulated guide groove having on its both sides a signal information recording sidewall W that is wobbled by providing address information as signal information FM-modulated at approximately 80 kHz with respect to a standard linear velocity, are alternately provided, and on which an area between the straight groove portion SG and the wobbled groove portion WG is provided as a land portion L, with the straight groove portion SG and the wobbled groove portion WG forming recording areas.

Figure 13:
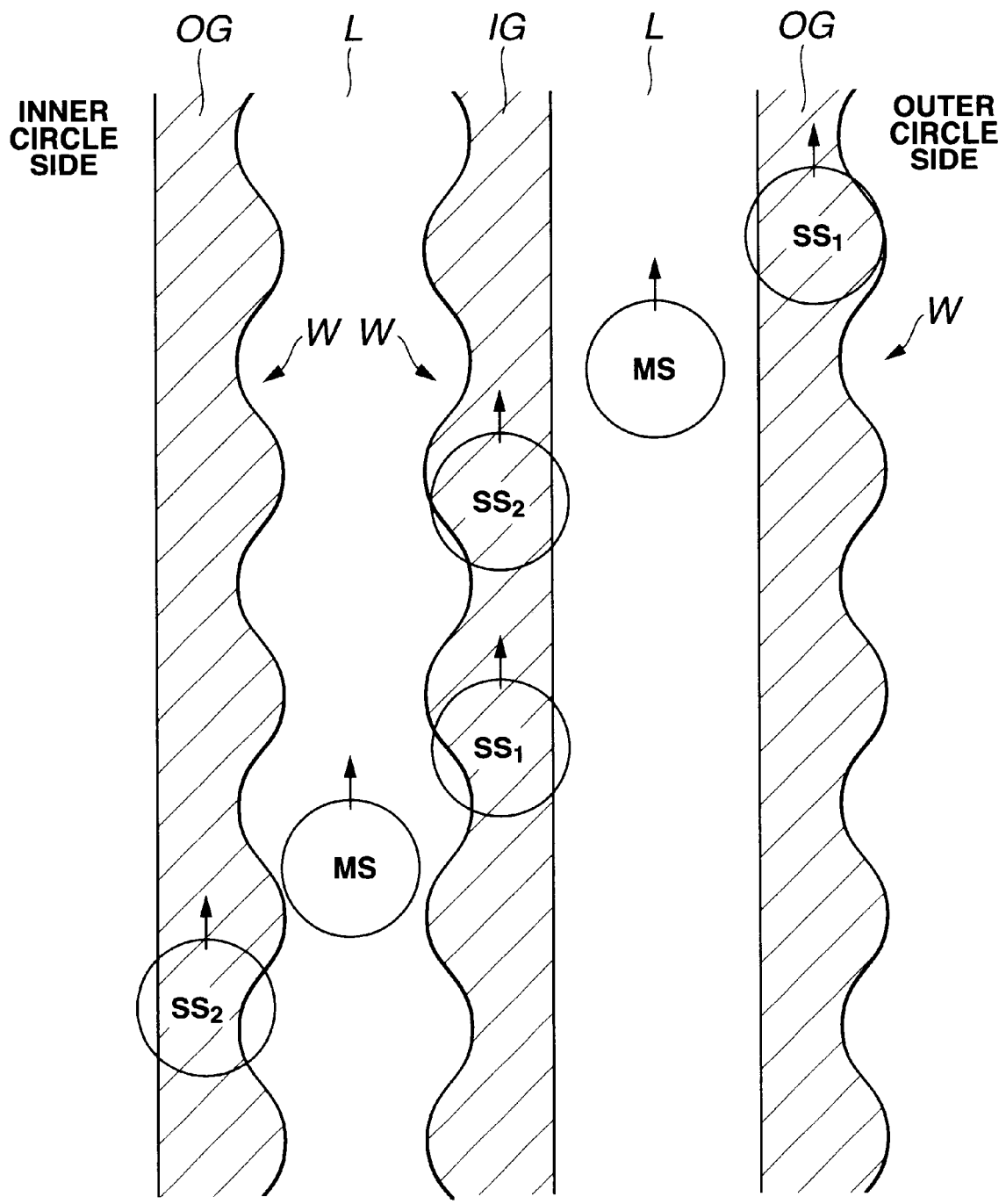
FIG. 13 is an explanatory view showing an optical disc applied to the optical disc reproducing device, so as to explain the state of a land substrate on which a groove portion as an inner-side modulated guide groove and a groove portion as an outer-side modulated guide groove are alternately provided.

The optical disc shown in FIG. 13 has a land substrate on which a groove portion IG, which is an inner-side modulated guide groove having an signal information recording sidewall W wobbled by providing FM-modulated address information as the sidewall on the inner circle side of the optical disc, and a groove portion OG, which is an outer-side modulated guide groove having a signal information recording sidewall W as the sidewall on the outer circle side of the optical disc, are alternately provided, and on which an area between the groove portion IG and the groove portion OG is provided as a land portion L, with the land portion L forming a recording area.

The optical disc reproducing device as an improvement of the above-described optical disc reproducing device 10 casts a laser beam onto these optical discs and forms a main beam spot MS and two sub-beam spots $SS_1$, $SS_2$ on the optical discs. All of these beam spots are Gaussian beams such that their intensity distribution is Gaussian distribution. The optical disc reproducing device carries out detection of the tilt quantity on the basis of the return lights of two beam spots (target beam spots), of the three beam spots formed on the optical disc.

Specifically, in the case where the optical disc having the land/groove substrate shown in FIG. 11 is used, the optical disc reproducing device uses the main beam spot MS and one of the two sub-beam spots $SS_1$, $SS_2$ as the target beam spots and carries out detection of the tilt quantity on the basis of the return lights of these target beam spots.

In the case where the optical disc having the groove substrate shown in FIG. 12 is used, the optical disc reproducing device uses the two sub-beam spots $SS_1$, $SS_2$ cast onto the land portion L as the target beam spots and carries out detection of the tilt quantity on the basis of the return lights of these target beam spots.

In the case where the optical disc having the land substrate shown in FIG. 13 is used, the optical disc reproducing device uses the two sub-beam spots $SS_1$, $SS_2$ cast onto the groove portions IG, OG as the target beam spots and carries out detection of the tilt quantity on the basis of the return lights of these target beam spots.

The following description generally covers the cases where the optical discs of FIGS. 11 to 13 are used. Therefore, it is not defined whether the two beam spots used for detecting the tilt quantity by the optical disc reproducing device include the main beam spot MS or the sub-beam spots $SS_1$, $SS_2$. When necessary, a beam spot in the case where the signal information recording sidewall W is located on the inner circle side of the optical disc than the laser beam from the optical pickup, not shown, is referred to as a spot $S_A$, as shown in FIG. 14A, and a beam spot in the case where the signal information recording sidewall W is located on the outer circle side of the optical disc is referred to as a spot $S_B$, as shown in FIG. 14B. Also, in the following description, a track irradiated with the spot $S_A$ is referred to as a track $T_A$ and a track irradiated with the spot $S_B$ is referred to as a track $T_B$, when necessary.

Figure 15:
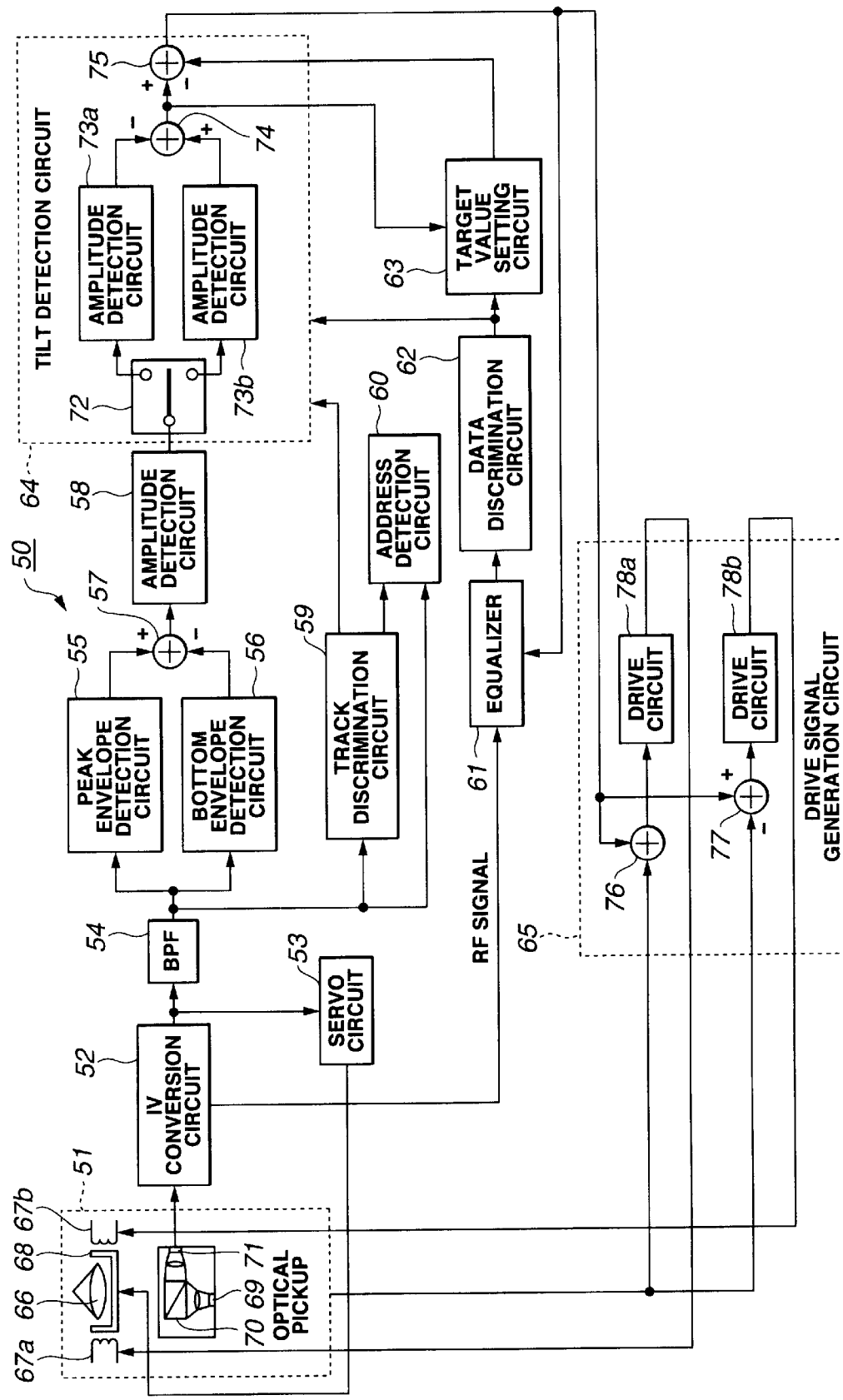
FIG. 15 is a block diagram showing the structure of the optical disc reproducing device.

An optical disc reproducing device 50 shown in FIG. 15 is adapted for detecting and compensating the tilt quantity on the basis of the return lights of two beam spots, of the three beam spots formed on the optical disc, by utilizing the characteristics shown in FIGS. 4 and 5.

As shown in FIG. 15, the optical disc reproducing device 50 includes: an optical pickup 51 for reading out digital data recorded on an optical disc, not shown; an IV conversion circuit 52 for carrying out current-voltage conversion of the signal outputted from the optical pickup 51; a servo circuit 53 for causing the optical pickup 51 to carry out tracking so as to keep a constant distance from the optical disc and for controlling the rotational driving operation of a spindle motor, not shown; a band pass filter 54 for passing a signal of a desired frequency component; a peak envelope detection circuit 55 for detecting a peak envelope of a wobble component signal passed by the band pass filter 54; a bottom envelope detection circuit 56 for detecting a bottom envelope of the wobble component signal passed by the band pass filter 54; a subtractor 57 for calculating the difference between the peak envelope detected by the peak envelope detection circuit 55 and the bottom envelope detected by the bottom envelope detection circuit 56; an amplitude detection circuit 58 for detecting the amplitude of the wobble component signal on the basis of the output from the subtractor 57; a track discrimination circuit 59 for discriminating whether the wobble component signal passed by the band pass filter 54 is based on the return light from the track $T_A$ or based on the return light from the track $T_B$; an address detection circuit 60 for extracting and detecting the address recorded on the optical disc from the wobble component signal passed by the band pass filter 54; an equalizer 61 for performing waveform equalization processing on an RF signal inputted from the IV conversion circuit 52; a data discrimination circuit 62 for extracting data from the signal inputted from the equalizer 61 and discriminating the data detection capability; a target value setting circuit 63 for setting a target value for compensation with respect to a tilt indication value indicating the tilt quantity detected by a tilt detection circuit 64, which is described later; the tilt detection circuit 64 for carrying out detection of the tilt quantity; and a drive signal generation circuit 65 for generating a drive signal to drive focusing coils 67a, 67b of the optical pickup 51 for compensating the tilt.

The optical pickup 51 has: an objective lens 66 for condensing a laser beam from a laser diode 69; the focusing coils 67a, 67b for inclining the objective lens 66 with respect to the optical disc; an actuator 68 for driving the objective lens 66 by the electromagnetic force of the focusing coils 67a, 67b; the laser diode 69 for emitting a laser beam; a prism 70 for transmitting the laser beam emitted from the laser diode 69 and for internally reflecting a return light reflected and diffracted on the optical disc surface; and a photodiode 71 for receiving the return light which is reflected and diffracted on the optical disc surface and made incident thereon by the prism 70.

The objective lens 66, similar to the above-described objective lens 25, condenses the laser beam from the laser diode 69 and casts it onto the optical disc, not shown.

The focusing coils 67a, 67b are adapted for inclining the objective lens 66 with respect to the optical disc. A current of a magnitude based on the drive signal supplied from the drive signal generation circuit 65 flows through each of the focusing coils 67a, 67b. The focusing coils 67a, 67b respectively drive the actuator 68 into the direction of compensating a tilt, using an electromagnetic force generated by an effect with a magnet, not shown.

The actuator 68 drives the objective lens 66 so as to cause the objective lens 66 to track at a desired position on the optical disc, not shown. The actuator 68 inclines the objective lens 66 with respect to the optical disc, using the electromagnetic force of the focusing coils 67a, 67b.

The laser diode 69, similar to the above-described laser diode 28, has a light emitting section made of, for example, a semiconductor laser, to emit a laser beam. The laser beam emitted from the laser diode 69 becomes incident on the prism 70.

The prism 70, similar to the above-described prism 29, transmits the laser beam which is emitted from the laser diode 69 and made incident thereon, and radiates the laser beam to the objective lens 66. Also, the prism 70 internally reflects the return light which is reflected and diffracted on the optical disc surface and made incident thereon, and radiates the return light to the photodiode 71.

The photodiode 71, similar to the above-described photodiode 30, has a photodetector and a photoelectric conversion section. The photodiode 71 receives the return light which is reflected and diffracted on the optical disc surface and made incident thereon by the prism 70, then converts the return light into an electric signal, and outputs the electric signal to the IV conversion circuit 52 on the subsequent stage.

In the optical pickup 51 thus constituted, the laser beam emitted from the laser diode 69 is cast onto the optical disc, not shown, to form a main beam spot MS, and the return light of the main beam spot MS reflected and diffracted on the optical disc surface is received, thus reading out digital data recorded on the track on the optical disc surface. The optical pickup 51 also has an optical system for splitting the laser beam into the main beam spot MS and two sub-beam spots $SS_1$, $SS_2$, then casting these beam spots to the optical disc, not shown, and receiving the return lights reflected and diffracted on the optical disc surface, as described above. The return lights of the sub-beam spots $SS_1$, $SS_2$ reflected and diffracted on the optical disc surface are used for track discrimination of the main beam spot MS by the track discrimination circuit 59. Furthermore, the optical pickup 51 outputs a focusing error signal indicating a focusing error of the objective lens 66 to the drive signal generation circuit 65.

The IV conversion circuit 52, similar to the above-described IV conversion circuit 12, carries out current-voltage conversion of the signal outputted from the photodiode 71. The IV conversion circuit 52 outputs the signal as a result of conversion to the servo circuit 53 and the band pass filter 54 on the subsequent stages. The IV conversion circuit 52 also outputs the RF signal as a result of conversion of the return light of the main beam spot MS to the equalizer 61 on the subsequent stage.

The servo circuit 53, similar to the above-described servo circuit 13, carries out focusing and driving of the optical pickup 51 so as to keep a constant distance from the optical disc and controls the rotational driving operation of the spindle motor, not shown, on the basis of the signal supplied from the IV conversion circuit 52.

The band pass filter 54 cuts off the RF signal component and other noise components and passes a signal of a desired frequency component so as to take out the wobble component signal from the signal information recording sidewall W, of the signal supplied from the IV conversion circuit 52. The wobble component signal passed by the band pass filter 54 is supplied to the peak envelope detection circuit 55, the bottom envelope detection circuit 56, the track discrimination circuit 59 and the address detection circuit 60 on the subsequent stages.

The peak envelope detection circuit 55 detects the peak envelope of the wobble component signal passed by the band pass filter 54. The peak envelope detection circuit 55 outputs the detected peak envelope to the subtractor 57 on the subsequent stage.

The bottom envelope detection circuit 56 detects the bottom envelope of the wobble component signal passed by the band pass filter 54. The bottom envelope detection circuit 56 outputs the detected bottom envelope to the subtractor 57 on the subsequent stage.

The subtractor 57 calculates the difference between the peak envelope supplied from the peak envelope detection circuit 55 and the bottom envelope supplied from the bottom envelope detection circuit 56 and outputs the resultant differential signal to the amplitude detection circuit 58 on the subsequent stage.

The amplitude detection circuit 58 detects the amplitude of the wobble component signal on the basis of the differential signal supplied from the subtractor 57. The amplitude detection circuit 58 supplies an amplitude detection signal indicating the detected amplitude to the tilt detection circuit 64 on the subsequent stage.

The track discrimination circuit 59 carries out track discrimination of the main beam spot MS on the basis of the wobble component signal based on the sub-beam spots $SS_1$, $SS_2$ passed by the band pass filter 54. The track discrimination circuit 59 supplies a track discrimination signal indicating the result of track discrimination to the address detection circuit 60 and the tilt detection circuit 64 on the subsequent stages.

The address detection circuit 60 extracts and detects the address recorded on the optical disc from the wobble component signal based on the main beam spot MS passed by the band pass filter 54. In this case, the address detection circuit 60 discriminates whether the detected address is based on the return light from the signal information recording sidewall W constituting the track $T_A$ or based on the return light from the signal information recording sidewall W constituting the track $T_B$, on the basis of the track discrimination signal supplied from the track discrimination circuit 59.

The equalizer 61, similar to the above-described equalizer 21, is supplied with the RF signal from the IV conversion circuit 52 and performs waveform equalization processing for the correction of a jitter error of the RF signal or the like. The equalizer 61 adjusts the gain on the basis of a tilt error signal supplied from the tilt detection circuit 64, which will be described later, and thus compensates the lowering of the MTF. The equalizer 61 outputs the signal on which waveform equalization processing has been performed, to the data discrimination circuit 62 on the subsequent stage.

The data discrimination circuit 62, similar to the above-described data discrimination circuit 22, extracts data from the signal inputted from the equalizer 61 and discriminates the data detection capability such as the jitter error. The data discrimination circuit 62 supplies a data discrimination signal indicating the result of discrimination of the data detection capability to the target value setting circuit 63 and the tilt detection circuit 64 on the subsequent stages.

The target value setting circuit 63 sets a target value for compensation with respect to a tilt indication value indicating the tilt quantity detected by the tilt detection circuit 64, on the basis of the data discrimination signal supplied from the data discrimination circuit 62. The target value setting circuit 63 outputs the set target value to a subtractor 75 of the tilt detection circuit 64.

The tilt detection circuit 64 includes: a switch 72 for opening and closing on the basis of a sample pulse generated from a sample pulse circuit, not shown; an amplitude detection circuit 73a for detecting only the amplitude of the wobble component signal based on the return light from the track $T_A$ like the spot $S_A$; an amplitude detection circuit 73b for detecting only the amplitude of the wobble component signal based on the return light from the track $T_B$ like the spot $S_B$; a subtractor 74 for calculating the difference between the amplitude of the wobble component signal based on the return light from the track $T_A$ detected by the amplitude detection circuit 73a and the amplitude of the wobble component signal based on the return light from the track $T_B$ detected by the amplitude detection circuit 73b; and the subtractor 75 for calculating the difference between the differential value supplied from the subtractor 74 and the target value supplied from the target value setting circuit 63.

The switch 72 opens and closes on the basis of a sample pulse generated from the sample pulse circuit, not shown, and thus connects and cuts off the amplitude detection circuit 58 and the amplitude detection circuit 73a or the amplitude detection circuit 73b.

The amplitude detection circuit 73a is supplied with an amplitude detection signal indicating the amplitude detected by the amplitude detection circuit 58, and detects only the amplitude of the wobble component signal based on the return light from the track $T_A$. The amplitude detection circuit 73a outputs an amplitude signal indicating the detected amplitude to the subtractor 74 on the subsequent stage.

The amplitude detection circuit 73b is supplied with an amplitude detection signal indicating the amplitude detected by the amplitude detection circuit 58, and detects only the amplitude of the wobble component signal based on the return light from the track $T_B$. The amplitude detection circuit 73b outputs an amplitude signal indicating the detected amplitude to the subtractor 74 on the subsequent stage.

The subtractor 74 calculates the difference between the amplitude value indicated by the amplitude signal supplied from the amplitude detection circuit 73a and the amplitude value indicated by the amplitude signal supplied from the amplitude detection circuit 73b. The subtractor 74 outputs a tilt indication value, which is the resultant differential value, to the subtractor 75 on the subsequent stage.

The subtractor 75 calculates the difference between the tilt indication value supplied from the subtractor 74 and the target value supplied from the target value setting circuit 63, and outputs a tilt error signal expressed as the differential value to the equalizer 61 and the drive signal generation circuit 65 on the subsequent stages.

The tilt detection circuit 64 thus constituted detects the tilt quantity on the basis of the amplitude detection signal of the wobble component signal supplied from the amplitude detection circuit 58 and the track discrimination signal supplied from the track discrimination circuit 59, and outputs the generated tilt error signal to the equalizer 61 and the drive signal generation circuit 65.

The drive signal generation circuit 65 includes: an adder 76 for calculating the sum of the focusing error signal supplied from the optical pickup 51 and the tilt error signal supplied from the tilt detection circuit 64; a subtractor 77 for calculating the difference between the focusing error signal supplied from the optical pickup 51 and the tilt error signal supplied from the tilt detection circuit 64; a drive circuit 78a for generating a drive signal indicating the magnitude of a current to be flowing through the focusing coil 67a on the basis of the sum value supplied from the adder 76; and a drive circuit 78b for generating a drive signal indicating the magnitude of a current to be flowing through the focusing coil 67b on the basis of the differential value supplied from the subtractor 77.

The adder 76 calculates the sum of the focusing error signal indicating the focusing error of the objective lens 66 supplied from the optical pickup 51 and the tilt error signal supplied from the tilt detection circuit 64, and outputs the sum value to the drive circuit 78a.

The subtractor 77 calculates the difference between the focusing error signal indicating the focusing error of the objective lens 66 supplied from the optical pickup 51 and the tilt error signal supplied from the tilt detection circuit 64, and outputs the differential value to the drive circuit 78b.

The drive circuit 78a generates a drive signal indicating the magnitude of a current to be flowing through the focusing coil 67a on the basis of the sum value supplied from the adder 76. The drive circuit 78a outputs the generated drive signal to the focusing coil 67a.

The drive circuit 78b generates a drive signal indicating the magnitude of a current to be flowing through the focusing coil 67b on the basis of the differential value supplied from the subtractor 77. The drive circuit 78b outputs the generated drive signal to the focusing coil 67b.

The drive signal generation circuit 65 thus constituted generates the drive signals for compensating the tilt and outputs these drive signals to the focusing coils 67a, 67b.

In the optical disc reproducing device 50 having the above-described constituent parts, the wobble component signal $SIG_A$ in the case where the laser beam is cast onto the track $T_A$ like the above-described spot $S_A$ and the wobble component signal $SIG_B$ in the case where the laser beam is cast onto the track $T_B$ like the spot $S_B$ are sampled, and the tilt indication value expressed as the differential value between the wobble component signal $SIG_A$ in the case where the laser beam is cast onto the track $T_A$ and the wobble component signal $SIG_B$ in the case where the laser beam is cast onto the track $T_B$ is found by the tilt detection circuit 64. The optical pickup 51 is controlled and driven so as to make the tilt indication value close to the target value set by the target value setting circuit 63.

In the optical disc reproducing device 50, a preset arbitrary value or a value recorded on a control track as a control information recording area of the optical disc may be used as the target value. However, in the optical disc reproducing device 50, similar to the above-described optical disc reproducing device 10, the target value can also be set by the following method as the initial operation in loading the optical disc.

In the optical disc reproducing device 50, at the time of loading the optical disc, the drive signals are supplied to the focusing coils 67a, 67b, and the actuator 68 of the optical pickup 51 is driven while the tilt quantity is changed. Then, in the optical disc reproducing device 50, the tilt indication value corresponding to the change in the tilt quantity is found by the tilt detection circuit 64, and the tilt indication value is sequentially supplied to the target value setting circuit 63. Moreover, in the optical disc reproducing device 50, the correlation between the tilt indication value supplied from the tilt detection circuit 64 and the data detection error based on the data discrimination signal supplied from the data discrimination circuit 62 is measured by the target value setting circuit 63. Then, in the optical disc reproducing device 50, the tilt indication value that minimizes the data detection error is set as the target value by the target value setting circuit 63.

In this manner, in the optical disc reproducing device 50, an optimum target value can be set on the basis of the correlation between the tilt indication value and the data detection error.

Specifically, the optical disc reproducing device 50 samples the wobble component signal $SIG_A$ and the wobble component signal $SIG_B$ and detects the tilt quantity in accordance with the following method.

In the optical disc reproducing device 50, the main beam spot MS and the two sub-beam spots $SS_1$, $SS_2$ are cast onto the optical disc by the optical pickup 51, similarly to the normal reproduction.

At this point, if the spot $S_A$ and the spot $S_B$ are normally cast onto the optical disc without being influenced by the tilt, that is, if the tilt quantity is "0°", the amplitude of the wobble component signal passed by the band pass filter 54 is equivalent to the amplitudes of the wobble component signal $SIG_A$ based on the return light of the spot $S_A$ from the signal information recording sidewall W and the wobble component signal $SIG_B$ based on the return light of the spot $S_B$ from the signal information recording sidewall W.

On the other hand, if the spot $S_A$ and the spot $S_B$ are normally cast onto the optical disc in the state where these spots are influenced by the tilt and inclined toward one of the signal information recording sidewalls W, the amplitude of the wobble component signal passed by the band pass filter 54 is different from the amplitudes of the wobble component signal $SIG_A$ based on the return light of the spot $S_A$ from the signal information recording sidewall W and the wobble component signal $SIG_B$ based on the return light of the spot $S_B$ from the signal information recording sidewall W.

Therefore, the amplitude signals, obtained by detecting the amplitudes of the wobble component signals $SIG_A$, $SIG_B$ by the amplitude detection circuits 73a, 73b of the tilt detection circuit 64 and supplied to the subtractor 74, are changed in the amplitude in an edge-like shape in accordance with the shift of the three beam spots.

On the basis of such amplitude signals, the optical disc reproducing device 50 detects the tilt indication value, which is the differential value obtained by the subtractor 74 of the tilt detection circuit 64, and generates the tilt error signal. The optical disc reproducing device 50 repeats such operation for a plurality of times.

In this manner, the optical disc reproducing device 50 can detect and compensate the tilt quantity. Thus, the optical disc reproducing device 50 can quickly detect the tilt quantity without having any latency time of the optical disc. Since a plurality of tilt indication values are found during one rotation of the optical disc, the optical disc reproducing device 50 can detect the tilt quantity with high accuracy.

That is, the optical disc reproducing device 50 can solve the above-described problems and can carry out tilt detection and compensation quickly and with high accuracy without having the need to carry out complicated operations.

As described above, the optical disc reproducing device 10 can carry out tilt detection and compensation without having a dedicated sensor for tilt detection, by casting a laser beam onto the optical disc by the optical pickup 11 and detecting the return light thereof. The optical disc reproducing device 50 can carry out tilt detection and compensation without having a dedicated sensor for tilt detection, by casting a main beam spot MS and two sub-beam spots $SS_1$, $SS_2$ onto the optical disc by the optical pickup 51 and detecting the return lights of two beam spots of these three beam spots.

Therefore, the optical disc reproducing devices 10, 50 can detect and compensate the tilt quantity even for an optical disc which is reduced in thickness and diameter by increasing the numerical aperture (NA) of the objective lenses 25, 66, respectively.

It is to be understood that the present invention is not limited to the above-described embodiments. For example, in the optical disc reproducing device 10, the method for sampling the wobble component signal $SIG_A$ in the case where the laser beam is cast onto the track $T_A$ and the wobble component signal $SIG_B$ in the case where the laser beam is cast onto the track $T_B$ need not be a method for sampling the wobble component signal in the case where the objective lens 25 is located near the center (zero point) of the track on the optical disc, and such processing need not necessarily be carried out.

As the method for correcting the imbalance phenomenon, the gain of the signal may be controlled so that the peak value of one of the wobble component signals with respect to the tilt quantity coincides with the peak value of the other wobble component signal.

Moreover, in the case where the optical disc shown in FIG. 11 is applied in the optical disc reproducing device 50, two sub-beam spots $SS_1$, $SS_2$ need not necessarily be provided and only one sub-beam spot may suffice.

Furthermore, as a matter of course, the present invention is applicable not only to an optical disc reproducing device for reproducing digital data from an optical disc but also to a recording device for recording digital data onto an optical disc.

Thus, it is a matter of course that various modifications can be made without departing from the scope of the present invention.

Industrial Applicability

As described above in detail, the recording medium driving device according to the present invention is adapted for rotationally driving a disc-shaped recording medium in which signal information that can be discriminated from recording data is recorded on one of both sidewalls of a recording area having the recording data recorded thereon, and recording and/or reproducing digital data to and/or from the disc-shaped recording medium. The device comprises: optical pickup means for casting a laser beam onto the disc-shaped recording medium and receiving a return light reflected and diffracted on the surface of the disc-shaped recording medium; amplitude detection means for detecting the amplitude of a signal based on a return light from the signal information recording sidewall, which is the sidewall having the signal information recorded thereon; and tilt detection means for detecting the tilt quantity on the basis of the amplitude of the signal detected by the amplitude detection means.

Therefore, the recording medium driving device according to the present invention can detect the tilt quantity on the basis of the return light from the signal information recording sidewall of the disc-shaped recording medium, and can carry out tilt detection without having a dedicated sensor for tilt detection.

The tilt detection method according to the present invention comprises the steps of: casting a laser beam onto a disc-shaped recording medium in which signal information that can be discriminated from recording data is recorded on one of both sidewalls of a recording area having the recording data recorded thereon, and receiving a return light reflected and diffracted on the surface of the disc-shaped recording medium; detecting the amplitude of a signal based on a return light from the signal information recording sidewall, which is the sidewall having the signal information recorded thereon; and detecting the tilt quantity on the basis of the amplitude of the detected signal detected.

Therefore, in the tilt detection method according to the present invention, the tilt quantity can be detected on the basis of the return light from the signal information recording sidewall of the disc-shaped recording medium, and tilt detection can be carried out without having a dedicated sensor for tilt detection.

Moreover, the recording medium driving device according to the present invention is adapted for rotationally driving a disc-shaped recording medium having a signal information recording sidewall on which signal information that can be discriminated from recording data is recorded, and recording and/or reproducing digital data to and/or from the disc-shaped recording medium. The device comprises: optical pickup means for casting a laser beam formed by a main beam spot and two sub-beam spots onto the disc-shaped recording medium and receiving a return light reflected and diffracted on the surface of the disc-shaped recording medium; amplitude detection means for detecting the amplitude of a signal based on a return light of two target beam spots, of the main beam spot and two sub-beam spots, from the signal information recording sidewall; and tilt detection means for detecting the tilt quantity on the basis of the amplitude of the signal detected by the amplitude detection means.

Therefore, in the recording medium driving device according to the present invention, a laser beam formed by a main beam spot and two sub-beam spots is cast onto the disc-shaped recording medium by the optical pickup means, and the tilt quantity can be detected by the tilt detection means on the basis of the amplitude of a signal based on a return light of two target beam spots, of the main beam spot and two sub-beam spots, from the signal information recording sidewall. Thus, tilt detection can be carried out quickly and with high accuracy without providing a dedicated sensor for tilt detection.

Furthermore, the tilt detection method according to the present invention comprises the steps of: casting a laser beam formed by a main beam spot and two sub-beam spots onto a disc-shaped recording medium having a signal information recording sidewall on which signal information that can be discriminated from recording data is recorded, and receiving a return light reflected and diffracted on the surface of the disc-shaped recording medium; detecting the amplitude of a signal based on a return light of two target beam spots, of the main beam spot and two sub-beam spots, from the signal information recording sidewall; and detecting the tilt quantity on the basis of the amplitude of the detected signal.

Therefore, in the tilt detection method according to the present invention, a laser beam formed by a main beam spot and two sub-beam spots is cast onto the disc-shaped recording medium, and the tilt quantity can detected on the basis of the amplitude of a signal based on a return light of two target beam spots, of the main beam spot and two sub-beam spots, from the signal information recording sidewall. Thus, tilt detection can be carried out quickly and with high accuracy without having a dedicated sensor for tilt detection.

What is claimed is:

1. A recording medium driving device for rotationally driving a disc-shaped recording medium in which signal information that can be discriminated from recording data is recorded on one of both sidewalls of a recording area having the recording data recorded thereon, and recording and/or reproducing digital data to and/or from the disc-shaped recording medium, the device comprising:

optical pickup means for casting a laser beam onto the disc-shaped recording medium and receiving a return light reflected and diffracted on a surface of the disc-shaped recording medium;

amplitude detection means for detecting an amplitude of a signal based on a return light from a signal information recording sidewall, which is a sidewall having the signal information recording thereon;

tilt detection means for detecting a tilt quantity base on the amplitude of the signal detected by the amplitude detection means, wherein the tilt detection means generates a drive signal for compensating a tilt on the basis of a tilt error signal expressed as a differential value between a tilt indication value indicating the tilt quantity and a target value for compensation with respect to the tilt indication value; and data discrimination means for extracting the recording data from an RF signal based on the return light reflected and diffracted on the surface of the disc-shaped recording medium and discriminating data detection capability with respect to the recording data, wherein the tilt detection means controls and drives the optical pickup means while changing the tilt quantity on the basis of the drive signal, then finds a tilt indication value corresponding to the change in tilt quantity, and sets the target value on the basis of the tilt indication value thus found and a data discrimination signal indicating a result of discrimination of the data detection capability by the data discrimination means.

2. The recording medium driving device as claimed in claim 1, wherein the tilt detection means finds the differential value between the amplitude of the signal based on the return light from the signal information recording sidewall in the case where the laser beam is located on the inner circle side of the disc-shaped recording medium than the signal information recording sidewall and the amplitude of the signal based on the return light from the signal information recording sidewall in the case where the laser beam is located on the outer circle side of the disc-shaped recording medium than the signal information recording sidewall, as a tilt indication value indicating the tilt quantity.

3. The recording medium driving device as claimed in claim 1, wherein the disc-shaped recording medium has a guide groove and a land portion alternately arranged thereon as the recording area, with one sidewall of the guide groove being the signal information recording sidewall modulated in a predetermined cycle in the direction of width of the guide groove, and wherein address information as the signal information is recorded on the signal information recording sidewall.

4. The recording medium driving device as claimed in claim 1, wherein the disc-shaped recording medium has a modulated guide groove and a non-modulated guide groove alternately arranged thereon, the modulated guide groove having its width or position modulated on its both sidewalls as the signal information recording sidewall, the non-modulated guide groove not being modulated on its both sidewalls, with an area between the modulated guide groove and the non-modulated guide groove being the recording area, and wherein address information as the signal information is recorded on the signal information recording sidewall.

5. The recording medium driving device as claimed in claim 1, wherein the tilt detection means sets a target value for compensation with respect to a tilt indication value indicating the tilt quantity.

6. The recording medium driving device as claimed in claim 5, wherein the target value is an arbitrary preset value.

7. The recording medium driving device as claimed in claim 5, wherein the target value is a value recorded in a control information recording area of the disc-shaped recording medium.

8. The recording medium driving device as claimed in claim 1, wherein the optical pickup means is controlled so as to make the tilt indication value close to the target value base on the drive signal generated by the tilt detection means.

9. The recording medium driving device as claimed in claim 1, further comprising waveform equalization means for performing waveform equalization processing on an RF signal based on the return light reflected and diffracted on the surface of the disc-shaped recording medium, wherein the waveform equalization means carries out gain adjustment on the basis of the tilt error signal found by the tilt detection means.

10. A recording medium driving device for rotationally driving a disc-shaped recording medium in which signal information that can be discriminated from recording data is recorded on one of both sidewalls of a recording area having the recording data recorded thereon, and recording and/or reproducing digital data to and/or from the disc-shaped recording medium, the device comprising:

optical pickup means for casting a laser beam onto the disc-shaped recording medium and receiving a return light reflected and diffracted on a surface of the disc-shaped recording medium;

amplitude detection means for detecting an amplitude of a signal based on a return light from a signal information recording sidewall, which is a sidewall having the signal information recording thereon;

tilt detection means for detecting a tilt quantity base on the amplitude of the signal detected by the amplitude detection means;

position detection means for detecting a position of an objective lens of the optical pickup means base on a sensing signal obtained by a sensor for sensing the position of the objective lens of the optical pickup means with respect to the recording area on the disc-shaped recording medium;

gate pulse generation means for discriminating that the objective lens is located near the center in the direction of width of the recording area on the disc-shaped recording medium on the basis of a detection signal indicating the position of the objective lens supplied from the position detection means, and generating a gate pulse; and switch means for opening and closing base on the gate pulse generated by the gate pulse generation means;

wherein in the case where the objective lens is located near the center in the direction of width of the recording area on the disc-shaped recording medium, the amplitude detection means detects the amplitude of a signal based on the return light from the signal information recording sidewall as the switch means closes based on the gate pulse generated by the gate pulse generation means.

11. A recording medium driving device for rotationally driving a disc-shaped recording medium in which signal information that can be discriminated from recording data is recorded on one of both sidewalls of a recording area having the recording data recorded thereon, and recording and/or reproducing digital data to and/or from the disc-shaped recording medium, the device comprising:

optical pickup means for casting a laser beam onto the disc-shaped recording medium and receiving a return light reflected and diffracted on a surface of the disc-shaped recording medium;

amplitude detection means for detecting an amplitude of a signal based on a return light from the signal information recording sidewall, which is a sidewall having the signal information recording thereon; and tilt detection means for detecting a tilt quantity on the amplitude of the signal detected by the amplitude detection means;

wherein the tilt detection means standardizes a signal based on a return light from the signal information recording sidewall in the case where the laser beam is located on the inner circle side of the disc-shaped recording medium than the signal information recording sidewall or a signal based on the return light from the signal information recording sidewall in the case where the laser beam is located on an outer circle side of the disc-shaped recording medium than the signal information recording sidewall so that, of a maximum value of the amplitude of the signal based on the return light from the signal information recording sidewall in the case where the laser beam is located on the inner circle side of the disc-shaped recording medium than the signal information recording sidewall and a maximum value of the amplitude of the signal based on the return light from the signal information recording sidewall in the case where the laser beam is located on the outer circle side of the disc-shaped recording medium than the signal information recording sidewall, one maximum value is made coincident with the other maximum value.

12. A tilt detection method comprising the steps of:

casting a laser beam onto a disc-shaped recording medium in which signal information that can be discriminated from recording data is recorded on one of both sidewalls of a recording area having the recording data recorded thereon, and receiving a return light reflected and diffracted on a surface of the disc-shaped recording medium;

detecting an amplitude of a signal based on a return light from a signal information recording sidewall, which is a sidewall having the signal information recorded thereon; and detecting a tilt quantity based on the amplitude of the detected signal detected, wherein a drive signal for compensating a tilt is generated based on a tilt error signal expressed as a differential value between a tilt indication value indicating the tilt quantity and a target value for compensation with respect to the tilt indication value, wherein the recording data is extracted from an RF signal based on the return light reflected and diffracted on the surface of the disc-shaped recording medium and the data detection capability with respect to the recording data is discriminated, and wherein optical pickup means for casting a laser beam onto the disc-shaped recording medium and receiving the return light reflected and diffracted on the surface of the disc-shaped recording medium is driven while changing the tilt quantity on the basis of the drive signal, then a tilt indication value corresponding to a change in the tilt quantity is found, and the target value is set on the basis of the tilt indication value thus found and a data discrimination signal indicating a result of discrimination of the data detection capability.

13. The tilt detection method as claimed in claim 12, wherein the differential value between the amplitude of the signal based on the return light from the signal information recording sidewall in the case where the laser beam is located on the inner circle side of the disc-shaped recording medium than the signal information recording sidewall and the amplitude of the signal based on the return light from the signal information recording sidewall in the case where the laser beam is located on the outer circle side of the disc-shaped recording medium than the signal information recording sidewall is found as a tilt indication value indicating the tilt quantity.

14. The tilt detection method as claimed in claim 12, wherein the disc-shaped recording medium has a guide groove and a land portion alternately arranged thereon as the recording area, with one sidewall of the guide groove being the signal information recording sidewall modulated in a predetermined cycle in the direction of width of the guide groove, and wherein address information as the signal information is recorded on the signal information recording sidewall.

15. The tilt detection method as claimed in claim 12, wherein the disc-shaped recording medium has a modulated guide groove and a non-modulated guide groove alternately arranged thereon, the modulated guide groove having its width or position modulated on its both sidewalls as the signal information recording sidewall, the non-modulated guide groove not being modulated on its both sidewalls, with an area between the modulated guide groove and the non-modulated guide groove being the recording area, and wherein address information as the signal information is recorded on the signal information recording sidewall.

16. The tilt detection method as claimed in claim 12, wherein a target value for compensation with respect to a tilt indication value indicating the tilt quantity is set.

17. The tilt detection method as claimed in claim 16, wherein the target value is an arbitrary preset value.

18. The tilt detection method as claimed in claim 16, wherein the target value is a value recorded in a control information recording area of the disc-shaped recording medium.

19. The tilt detection method as claimed in claim 12, wherein optical pickup means for casting a laser beam onto the disc-shaped recording medium and receiving the return light reflected and diffracted on the surface of the disc-shaped recording medium is controlled so as to make the tilt indication value close to the target value based on the drive signal.

20. The tilt detection method as claimed in claim 12, wherein gain adjustment in waveform equalization processing performed on an RF signal based on the return light reflected and diffracted on the surface of the disc-shaped recording medium is carried out based on the tilt error signal.

21. A tilt detection method comprising the steps of:

casting a laser beam onto a disc-shaped recording medium in which signal information that can be discriminated from recording data is recorded on one of both sidewalls of a recording area having the recording data recorded thereon, and receiving a return light reflected and diffracted on a surface of the disc-shaped recording medium;

detecting an amplitude of a signal based on a return light from a signal information recording sidewall, which is a sidewall having the signal information recorded thereon;

detecting a tilt quantity on the basis of the amplitude of the detected signal detected;

detecting a position of an objective lens of optical pickup means for casting a laser beam onto the disc-shaped recording medium and receiving the return light reflected and diffracted on the surface of the disc-shaped recording medium, based on a sensing signal obtained by sensing the position of the objective lens of the optical pickup means with respect to the recording area on the disc-shaped recording medium;

discriminating that the objective lens is located near the center in the direction of width of the recording area on the disc-shaped recording medium on the basis of a detection signal indicating the position of the objective lens, and generating a gate pulse; and closing switch means based on the gate pulse so as to detect the amplitude of a signal based on the return light from the signal information recording sidewall.

22. A tilt detection method comprising the steps of:

casting a laser beam onto a disc-shaped recording medium in which signal information that can be discriminated from recording data is recorded on one of both sidewalls of a recording area having the recording data recorded thereon, and receiving a return light reflected and diffracted on a surface of the disc-shaped recording medium;

detecting an amplitude of a signal based on a return light from a signal information recording sidewall, which is a sidewall having the signal information recorded thereon; and detecting a tilt quantity on the basis of the amplitude of the detected signal detected, wherein a signal based on the return light from the signal information recording sidewall in the case where the laser beam is located on an inner circle side of the disc-shaped recording medium than the signal information recording sidewall or a signal based on the return light from the signal information recording sidewall in the case where the laser beam is located on an outer circle side of the disc-shaped recording medium than the signal information recording sidewall is standardized so that, of a maximum value of the amplitude of the signal based on the return light from the signal information recording sidewall in the case where the laser beam is located on the inner circle side of the disc-shaped recording medium than the signal information recording sidewall and a maximum value of the amplitude of the signal based on the return light from the signal information recording sidewall in the case where the laser beam is located on the outer circle side of the disc-shaped recording medium than the signal information recording sidewall, one maximum value is made coincident with the other maximum value.

23. A recording medium driving device for rotationally driving a disc-shaped recording medium having a signal information recording sidewall on which signal information that can be discriminated from recording data is recorded, and recording and/or reproducing digital data to and/or from the disc-shaped recording medium, the device comprising:

optical pickup means for casting a laser beam formed by a main beam spot and two sub-beam spots onto the disc-shaped recording medium and receiving a return light reflected and diffracted on the surface of the disc-shaped recording medium;

amplitude detection means for detecting an amplitude of a signal based on a return light of two target beam spots, of the main beam spot and the two sub-beam spots, from the signal information recording sidewall;

tilt detection means for detecting a tilt quantity based on the amplitude of the signal detected by the amplitude detection means;

target value setting means for setting a target value for compensation with respect to a tilt indication value;

data discrimination means for extracting the recording data from an RF signal based on the return light reflected and diffracted on the surface of the disc-shaped recording medium, and discriminating data detection capability with respect to the recording data; and drive signal generation means for generating a drive signal for compensating a tilt on the basis of a tilt error signal expressed as a differential value between the tilt indication value and the target value for compensation with respect to the tilt indication value, wherein the drive signal generation means controls and drives the optical pickup means while changing the tilt quantity on the basis of the drive signal;

the tilt detection means finds the tilt indication value corresponding to a change in the tilt quantity; and the target value setting means sets the target value on the basis of the tilt indication value found by the tilt detection means and a data discrimination signal indicating the result of discrimination of the data detection capability by the data discrimination means.

24. The recording medium driving device as claimed in claim 23, wherein the tilt detection means finds, as a tilt indication value indicating the tilt quantity, the differential value between the amplitude of a first signal, which is a signal based on the return light from the signal information recording sidewall in the case where one of the two target beam spots is located on the inner circle side of the disc-shaped recording medium than the signal information recording sidewall, detected by the amplitude detection means, and the amplitude of a second signal, which is a signal based on the return light from the signal information recording sidewall in the case where the other one of the two target beam spots is located on the outer circle side of the disc-shaped recording medium than the signal information recording sidewall, detected by the amplitude detection means.

25. The recording medium driving device as claimed in claim 23, wherein the disc-shaped recording medium has a modulated guide groove and a non-modulated guide groove alternately provided thereon, the modulated guide groove having its width or position modulated on its both sidewalls, the non-modulated guide groove not being modulated on its both sidewalls, with an area between the modulated guide groove and the non-modulated guide groove being provided as a land portion, with the modulated guide groove and the non-modulated guide groove being used as a recording area for recording the recording data therein, and wherein address information as the signal information is recorded on the signal information recording sidewall.

26. The recording medium driving device as claimed in claim 25, wherein the optical pickup means casts the main beam spot to the modulated guide groove or the non-modulated guide groove, and casts the two sub-beam spots to the two land portions, respectively, adjacent to the modulated guide groove or the non-modulated guide groove to which the main beam spot is cast, the amplitude detection means detects the amplitudes of signals based on the return lights of the two sub-beam spots from the signal information recording sidewall, as the amplitudes of the signals based on the return lights of the two target beam spots from the signal information recording sidewall, and the tilt detection means finds, as a tilt indication value indicating the tilt quantity, the differential value between the amplitude of a first signal, which is a signal based on the return light from the signal information recording sidewall in the case where one of the two sub-beam spots is located on the inner circle side of the disc-shaped recording medium than the signal information recording sidewall, detected by the amplitude detection means, and the amplitude of a second signal, which is a signal based on the return light from the signal information recording sidewall in the case where the other one of the two sub-beam spots is located on the outer circle side of the disc-shaped recording medium than the signal information recording sidewall, detected by the amplitude detection means.

27. The recording medium driving device as claimed in claim 23, wherein the disc-shaped recording medium has an inner-side modulated guide groove and an outer-side modulated guide groove alternately provided thereon, the inner-side modulated guide groove having the signal information recording sidewall as a sidewall on the inner circle side of the disc-shaped recording medium, the outer-side modulated guide groove having the signal information recording sidewall as a sidewall on the outer circle side of the disc-shaped recording medium, with an area between the inner-side modulated guide groove and the outer-side modulated guide groove being provided as a land portion, the land portion being used as a recording area for recording the recording data therein, and wherein address information as the signal information is recorded on the signal information recording sidewall.

28. The recording medium driving device as claimed in claim 27, wherein the optical pickup means casts the main beam spot to the land portion, and casts the two sub-beam spots to the inner-side modulated guide groove and the outer-side modulated guide groove adjacent to the land portion, respectively, the amplitude detection means detects the amplitudes of signals based on the return lights of the two sub-beam spots from the signal information recording sidewall, as the amplitudes of the signals based on the return lights of the two target beam spots from the signal information recording sidewall, and the tilt detection means finds, as a tilt indication value indicating the tilt quantity, the differential value between the amplitude of a first signal, which is a signal based on the return light from the signal information recording sidewall in the case where one of the two sub-beam spots is located on the inner circle side of the disc-shaped recording medium than the signal information recording sidewall, detected by the amplitude detection means, and the amplitude of a second signal, which is a signal based on the return light from the signal information recording sidewall in the case where the other one of the two sub-beam spots is located on the outer circle side of the disc-shaped recording medium than the signal information recording sidewall, detected by the amplitude detection means.

29. The recording medium driving device as claimed in claim 23, wherein the disc-shaped recording medium has a guide groove and a land portion alternately provided thereon, the guide groove having the signal information recording sidewall on one of the inner circle side and the outer circle side of the disc-shaped recording medium, with the guide groove and the land portion being used as recording areas for recording the recording data therein, respectively, and wherein address information as the signal information is recorded on the signal information recording sidewall.

30. The recording medium driving device as claimed in claim 29, wherein the optical pickup means casts the main beam spot to the guide groove or the land portion, and casts the two sub-beam spots to the land portions or the guide grooves, respectively, adjacent to the land portion or the guide groove to which the main beam spot is cast, the amplitude detection means detects the amplitudes of signals based on the return lights of the two sub-beam spots from the signal information recording sidewall, as the amplitudes of the signals based on the return lights of the two target beam spots from the signal information recording sidewall, and the tilt detection means finds, as a tilt indication value indicating the tilt quantity, the differential value between the amplitude of a first signal, which is a signal based on the return light from the signal information recording sidewall in the case where the main beam spot is located on the inner circle side or the outer circle side of the disc-shaped recording medium than the signal information recording sidewall, detected by the amplitude detection means, and the amplitude of a second signal, which is a signal based on the return light from the signal information recording sidewall in the case where one of the two sub-beam spots is located on the outer circle side or the inner circle side of the disc-shaped recording medium than the signal information recording sidewall, detected by the amplitude detection means.

31. The recording medium driving device as claimed in claim 23, wherein the target value is an arbitrary preset value.

32. The recording medium driving device as claimed in claim 23, wherein the target value is a value recorded in a control information recording area on the disc-shaped recording medium.

33. The recording medium driving device as claimed in claim 23, further comprising drive signal generation means for generating a drive signal for compensating a tilt on the basis of a tilt error signal expressed as the differential value between the tilt indication value and a target value for compensation with the tilt indication value.

34. The recording medium driving device as claimed in claim 33, wherein the optical pickup means is controlled so as to make the tilt indication value close to the target value on the basis of the drive signal generated by the drive signal generation means.

35. The recording medium driving device as claimed in claim 33, further comprising waveform equalization means for performing waveform equalization processing on an RF signal based on the return light reflected and diffracted on the surface of the disc-shaped recording medium, wherein the waveform equalization means carries out gain adjustment on the basis of the tilt error signal found by the tilt detection means.

36. A tilt detection method comprising the steps of:

casting a laser beam formed by a main beam spot and two sub-beam spots onto a disc-shaped recording medium having a signal information recording sidewall on which signal information that can be discriminated from recording data is recorded, and receiving a return light reflected and diffracted on a surface of the disc-shaped recording medium;

detecting an amplitude of a signal based on a return light of two target beam spots, of the main beam spot and the two sub-beam spots, from the signal information recording sidewall; and detecting a tilt quantity on the basis of the amplitude of the detected signal, wherein a target value for compensation with respect to a tilt indication value is set, wherein the recording data is extracted from an RF signal based on the return light reflected and diffracted on the surface of the disc-shaped recording medium, and a data detection capability with respect to the recording data is discriminated, and optical pickup means for casting a laser beam forming the main beam spot and the two sub-beam spots on the disc-shaped recording medium and for receiving the return light reflected and diffracted on the surface of the disc-shaped recording medium is driven while changing the tilt quantity based on a drive signal for compensating a tilt based on a tilt error signal expressed as a differential value between the tilt indication value and the target value for compensation with respect to the tilt indication value, and the target value is set based on the tilt indication value thus found and a data discrimination signal indicating a result of the discrimination of the data detection capability.

37. The tilt detection method as claimed in claim 36, wherein the differential value between the detected amplitude of a first signal, which is a signal based on the return light from the signal information recording sidewall in the case where one of the two target beam spots is located on the inner circle side of the disc-shaped recording medium than the signal information recording sidewall, and the detected amplitude of a second signal, which is a signal based on the return light from the signal information recording sidewall in the case where the other one of the two target beam spots is located on the outer circle side of the disc-shaped recording medium than the signal information recording sidewall, is found as a tilt indication value indicating the tilt quantity.

38. The tilt detection method as claimed in claim 36, wherein the disc-shaped recording medium has a modulated guide groove and a non-modulated guide groove alternately provided thereon, the modulated guide groove having its width or position modulated on its both sidewalls, the non-modulated guide groove not being modulated on its both sidewalls, with an area between the modulated guide groove and the non-modulated guide groove being provided as a land portion, with the modulated guide groove and the non-modulated guide groove being used as a recording area for recording the recording data therein, and wherein address information as the signal information is recorded on the signal information recording sidewall.

39. The tilt detection method as claimed in claim 38, wherein the main beam spot is cast to the modulated guide groove or the non-modulated guide groove, and the two sub-beam spots are cast to the two land portions, respectively, adjacent to the modulated guide groove or the non-modulated guide groove to which the main beam spot is cast, the amplitudes of signals based on the return lights of the two sub-beam spots from the signal information recording sidewall are detected as the amplitudes of the signals based on the return lights of the two target beam spots from the signal information recording sidewall, and the differential value between the detected amplitude of a first signal, which is a signal based on the return light from the signal information recording sidewall in the case where one of the two sub-beam spots is located on the inner circle side of the disc-shaped recording medium than the signal information recording sidewall, and the detected amplitude of a second signal, which is a signal based on the return light from the signal information recording sidewall in the case where the other one of the two sub-beam spots is located on the outer circle side of the disc-shaped recording medium than the signal information recording sidewall, is found as a tilt indication value indicating the tilt quantity.

40. The tilt detection method as claimed in claim 36, wherein the disc-shaped recording medium has an inner-side modulated guide groove and an outer-side modulated guide groove alternately provided thereon, the inner-side modulated guide groove having the signal information recording sidewall as a sidewall on the inner circle side of the disc-shaped recording medium, the outer-side modulated guide groove having the signal information recording sidewall as a sidewall on the outer circle side of the disc-shaped recording medium, with an area between the inner-side modulated guide groove and the outer-side modulated guide groove being provided as a land portion, the land portion being used as a recording area for recording the recording data therein, and wherein address information as the signal information is recorded on the signal information recording sidewall.

41. The tilt detection method as claimed in claim 40, wherein the main beam spot is cast to the land portion, and the two sub-beam spots are cast to the inner-side modulated guide groove and the outer-side modulated guide groove adjacent to the land portion, respectively, the amplitudes of signals based on the return lights of the two sub-beam spots from the signal information recording sidewall are detected as the amplitudes of the signals based on the return lights of the two target beam spots from the signal information recording sidewall, and the differential value between the detected amplitude of a first signal, which is a signal based on the return light from the signal information recording sidewall in the case where one of the two sub-beam spots is located on the inner circle side of the disc-shaped recording medium than the signal information recording sidewall, and the detected amplitude of a second signal, which is a signal based on the return light from the signal information recording sidewall in the case where the other one of the two sub-beam spots is located on the outer circle side of the disc-shaped recording medium than the signal information recording sidewall, is found as a tilt indication value indicating the tilt quantity.

42. The tilt detection method as claimed in claim 36, wherein the disc-shaped recording medium has a guide groove and a land portion alternately provided thereon, the guide groove having the signal information recording sidewall on one of the inner circle side and the outer circle side of the disc-shaped recording medium, with the guide groove and the land portion being used as recording areas for recording the recording data therein, respectively, and wherein address information as the signal information is recorded on the signal information recording sidewall.

43. The tilt detection method as claimed in claim 42, wherein the main beam spot is cast to the guide groove or the land portion, and the two sub-beam spots are cast to the land portions or the guide grooves, respectively, adjacent to the land portion or the guide groove to which the main beam spot is cast, the amplitudes of signals based on the return lights of the two sub-beam spots from the signal information recording sidewall are detected as the amplitudes of the signals based on the return lights of the two target beam spots from the signal information recording sidewall, and the differential value between the detected amplitude of a first signal, which is a signal based on the return light from the signal information recording sidewall in the case where the main beam spot is located on the inner circle side or the outer circle side of the disc-shaped recording medium than the signal information recording sidewall, and the detected amplitude of a second signal, which is a signal based on the return light from the signal information recording sidewall in the case where one of the two sub-beam spots is located on the outer circle side or the inner circle side of the disc-shaped recording medium than the signal information recording sidewall, is found as a tilt indication value indicating the tilt quantity.

44. The tilt detection method as claimed in claim 36, wherein the target value is an arbitrary preset value.

45. The tilt detection method as claimed in claim 36, wherein the target value is a value recorded in a control information recording area on the disc-shaped recording medium.

46. The tilt detection method as claimed in claim 36, wherein a drive signal for compensating a tilt is generated on the basis of a tilt error signal expressed as the differential value between the tilt indication value and a target value for compensation with the tilt indication value.

47. The tilt detection method as claimed in claim 46, wherein optical pickup means for casing a laser beam forming a main beam spot and two sub-beam spots on the disc-shaped recording medium and for receiving the return light reflected and diffracted on the surface of the disc-shaped recording medium is controlled so as to make the tilt indication value close to the target value on the basis of the drive signal.

48. The tilt detection method as claimed in claim 46, wherein gain adjustment in waveform equalization processing on an RF signal based on the return light reflected and diffracted on the surface of the disc-shaped recording medium is carried out on the basis of the tilt error signal.

* * * * *